US010997106B1

(12) United States Patent
Bandaru et al.

(10) Patent No.: US 10,997,106 B1
(45) Date of Patent: May 4, 2021

(54) INTER-SMARTNIC VIRTUAL-LINK FOR CONTROL AND DATAPATH CONNECTIVITY

(71) Applicant: Pensando Systems Inc., Milpitas, CA (US)

(72) Inventors: Bharat Bandaru, Pleasanton, CA (US); Pirabhu Raman, Fremont, CA (US); J. Bradley Smith, San Jose, CA (US)

(73) Assignee: PENSANDO SYTEMS INC., Milpitas, CA (US)

( * ) Notice: Subject to any disclaimer, the term of this patent is extended or adjusted under 35 U.S.C. 154(b) by 0 days.

(21) Appl. No.: 17/028,242

(22) Filed: Sep. 22, 2020

(51) Int. Cl.
*G06F 13/40* (2006.01)
*G06F 13/42* (2006.01)
*G06F 13/38* (2006.01)
*H04L 12/46* (2006.01)

(52) U.S. Cl.
CPC ........ *G06F 13/4022* (2013.01); *G06F 13/385* (2013.01); *G06F 13/387* (2013.01); *G06F 13/4282* (2013.01); *H04L 12/4641* (2013.01); *G06F 2213/0026* (2013.01)

(58) Field of Classification Search
CPC ........................... G06F 13/4022; G06F 13/385
See application file for complete search history.

(56) References Cited

U.S. PATENT DOCUMENTS

| 6,393,483 B1 | 5/2002 | Latif et al. |
| 9,313,139 B2 | 4/2016 | Macchiano et al. |
| 10,237,187 B2 | 3/2019 | Paramasivam |
| 10,678,721 B1 * | 6/2020 | BeSerra ............. G06F 11/2221 |
| 10,732,879 B2 | 8/2020 | Niell et al. |
| 2010/0115174 A1 * | 5/2010 | Akyol ................... G06F 13/385 |
| | | 710/316 |
| 2017/0250954 A1 * | 8/2017 | Jain ..................... H04L 63/1416 |
| 2018/0307643 A1 * | 10/2018 | Zhang .................... G06F 13/10 |
| 2019/0042292 A1 | 2/2019 | Palermo et al. |

* cited by examiner

*Primary Examiner* — Zachary K Huson
(74) *Attorney, Agent, or Firm* — Wilson Sonsini Goodrich & Rosati

(57) ABSTRACT

Described are programmable IO devices installed on a host device and configured to execute instructions that cause the programmable IO device to perform operations to establish a virtual link between another programmable IO device installed on the host device and provide a data plane using the virtual link. These operations comprise: establishing the virtual link with the other programmable IO device installed on the host device, wherein the virtual link provides a communication channel between the programmable IO devices; providing the data plane by establishing, with the other programmable IO device via the virtual link, a data path associated with the data plane; receiving a packet in the data plane destined for the other programmable IO device; and forwarding the packet to the other programmable IO device via the virtual link.

33 Claims, 13 Drawing Sheets

INTER-SMARTNIC VIRTUAL-LINK FOR CONTROL AND DATAPATH CONNECTIVITY

BACKGROUND

Network traffic refers to the amount of data moving across a network at a given point of time. Network data is mostly encapsulated in network packets, which provide the load in the network. Network traffic is the main component for network traffic measurement, network traffic control, and simulation. The proper organization of network traffic helps in ensuring the quality of service in a given network.

SUMMARY

An edge device provides networking/policy enforcement/ security to transactions between workloads by, for example, maintaining a state for each of the transactions between these workloads, along with policies. Edge devices include stand-alone devices (e.g., routers and switches) and integrated input/output (TO) devices (e.g., network interface cards (NICs)). However, with increase in support of multiple intelligent edge devices (e.g., a smart network interface card (smartNIC)) slots on servers, the deployments requiring multiple smartNICs to function in different topologies has become paramount. Moreover, multi-smartNIC servers provide their own challenges to support various features, which may require communication between the SmartNICs.

Described herein, in certain embodiments, are systems employing a programable IO device (e.g., a smartNIC) to establish a virtual link between another programmable IO device installed on the host device and provide a data plane using the virtual link. This virtual link can be employed for control or data channel communication among programmable IO devices. Generally, the virtual link supports the services and features that require communication among the linked programmable IO devices installed on a multi-card/ device server. Moreover, the virtual link provides for decreased packet loss and increased traffic throughput as the programable IO devices can use the established communication path to share information (e.g., received packets and data path information) among themselves to reduce the support provided by the host device as well as network entities (e.g., a router resending packets). For example, the virtual links provided inband communication with link aggregation groups (LAG) across the installed programable IO devices. Also, the programmable IO devices can employ the virtual link for state synchronization of, for example, network, security, and storage services. Moreover, the linked programmable IO devices can employ the virtual link for provide a solution for encapsulated remote switched port analyzer (ERSPAN) traffic redirection for efficient use of links.

Accordingly, in one aspect, disclosed herein are programmable IO devices. These programmable IO device are installed on a host device and configured to execute instructions that cause the programmable IO device to perform operations to establish a virtual link between another programmable IO device installed on the host device and provide a data plane using the virtual link. These operations comprise: establishing the virtual link with the other programmable IO device installed on the host device, wherein the virtual link provides a communication channel between the programmable IO devices; providing the data plane by establishing, with the other programmable IO device via the virtual link, a data path associated with the data plane; receiving a packet in the data plane destined for the other programmable IO device; and forwarding the packet to the other programmable IO device via the virtual link. In some embodiments, the programmable IO device comprises a smartNIC. In some embodiments, the programmable IO device is installed on the host device via a peripheral component interconnect express (PCIe) interface. In some embodiments, the virtual link is established through PCIe peer-to-peer communication. In some embodiments, the virtual link is established via a shared PCIe bus. In some embodiments, the operations comprise exposing a memory bar accessible on the PCIe bus for communication to establish the virtual link. In some embodiments, an agent or a driver is installed on the host device. In some embodiments, the agent or drive configures the programmable IO device with a PCIe bus address of memory bars exposed by the other programmable IO device. In some embodiments, the operations comprise, once configured by the agent or the driver, communicating directly with the other programmable IO device through directing messages over the PCIe bus to establish the virtual link. In some embodiments, the programable IO device comprises a management port. In some embodiments, the virtual link is established via an external cable connected to the management port. In some embodiments, the virtual link is established through a PCIe switch configured to connect PCIe interfaces and PCIe peer-to-peer traffic. In some embodiments, the programmable IO device comprises at least one advanced reduced instruction set computer (RISC) machine (ARM) core communicably coupled to at least one central processing unit (CPU) core of the host device. In some embodiments, the operations comprise processing the packet with the ARM core to determine the destination of the packet. In some embodiments, the programmable IO devices are installed with LAG across the programmable IO devices. In some embodiments, the operations comprise determining a media access control (MAC) address for the other programmable IO device via the virtual link. In some embodiments, the operations comprise performing MAC address synchronization with the other programmable IO device via the virtual link. In some embodiments, the operations comprise synchronizing a flow state for the data plane with the other programmable IO device via the virtual link. In some embodiments, the operations comprise applying a security policy in the data plane based on the synchronized flow state. In some embodiments, the other programmable IO device comprises at last one port dedicated to ERSPAN traffic. In some embodiments, the operations comprise forwarding received ERSPAN traffic to the other programmable IO device. In some embodiments, the packet is received from a top of rack (TOR) switch.

In a related yet separate aspect, disclosed herein are multi-smartNIC server systems that provides a data plane. Each system comprises: at least two smartNICs installed via a PCIe interface. Each of these smartNICs are configured to: establish a virtual link with the other smartNICs, wherein the virtual link provides a communication channel among the smartNICs; provide a data plane by establishing, with the other smartNICs via the virtual link, a data path associated with the data plane; receive a packet in the data plane destined for one of the other smartNIC; and forward the packet to the other smartNIC via the virtual link. In some embodiments, the virtual link is established through PCIe peer-to-peer communication. In some embodiments, the virtual link is established via a shared PCIe bus. In some embodiments, smartNICs are configured to: expose a memory bar accessible on the PCIe bus for communication to establish the virtual link. In some embodiments, an agent or a driver is installed on the host device. In some embodiments, the agent or drive configures the programmable IO device with a PCIe bus address of memory bars exposed by the other programmable IO device. In some embodiments, the smartNICs are configured to, once configured by the agent or the driver, communicate directly with the other programmable IO device through directing messages over the PCIe bus to establish the virtual link. In some embodiments, the programable IO device comprises a management port. In some embodiments, the virtual link is established via an external cable connected to the management port. In some embodiments, the virtual link is established through a PCIe switch configured to connect PCIe interfaces and PCIe peer-to-peer traffic. In some embodiments, the programmable IO device comprises at least one ARM core communicably coupled to at least one CPU core of the host device. In some embodiments, the smartNICs are configured to process the packet with the ARM core to determine the destination of the packet. In some embodiments, the programmable IO devices are installed with LAG across the programmable IO devices. In some embodiments, the smartNICs are configured to determine a MAC address for the other programmable IO device via the virtual link. In some embodiments, smartNICs are configured t: performing MAC address synchronization with the other programmable IO device via the virtual link. In some embodiments, the smartNICs are configured to synchronize a flow state for the data plane with the other programmable IO device via the virtual link. In some embodiments, the smartNICs are configured to apply a security policy in the data plane based on the synchronized flow state. In some embodiments, the other programmable IO device comprises at last one port dedicated to ERSPAN traffic. In some embodiments, the smartNICs are configured to forward received ERSPAN traffic to the other programmable IO device. In some embodiments, the packet is received from a TOR switch.

In a related yet separate aspect, disclosed herein are methods for establishing a virtual link between programmable IO devices installed on a host device. These methods are executed by at least one of the programmable IO devices and comprise: establishing the virtual link with the other programmable IO devices installed on the host device, wherein the virtual link provides a communication channel among the programmable IO devices; providing a data plane by establishing, with the other programmable IO devices via the virtual link, a data path associated with the data plane; receiving a packet in the data plane destined for one of the other programmable IO devices; and forwarding the packet to the other programmable IO device via the virtual link. In some embodiments, each of the programmable IO devices comprises a smartNIC. In some embodiments, each of the programmable IO devices is installed on the host device via a PCIe interface. In some embodiments, the virtual link is established through PCIe peer-to-peer communication. In some embodiments, the virtual link is established via a shared PCIe bus. In some embodiments, the methods comprise exposing a memory bar accessible on the PCIe bus for communication to establish the virtual link. In some embodiments, an agent or a driver is installed on the host device. In some embodiments, the agent or drive configures the each of the programmable IO devices with a PCIe bus address of memory bars exposed by the other programmable IO device. In some embodiments, the methods comprise, once configured by the agent or the driver, communicating directly with the other programmable IO device through directing messages over the PCIe bus to establish the virtual link. In some embodiments, the programable IO device comprises a management port. In some embodiments, the virtual link is established via an external cable connected to the management port. In some embodiments, the virtual link is established through a PCIe switch configured to connect PCIe interfaces and PCIe peer-to-peer traffic. In some embodiments, the programmable IO device comprises at least one ARM core communicably coupled to at least one CPU core of the host device. In some embodiments, the methods comprise processing the packet with the ARM core to determine the destination of the packet. In some embodiments, the programmable IO devices are installed with LAG across the programmable IO devices. In some embodiments, the methods comprise determining a MAC address for the other programmable IO device via the virtual link. In some embodiments, the methods comprise performing MAC address synchronization with the other programmable IO device via the virtual link. In some embodiments, the methods comprise synchronizing a flow state for the data plane with the other programmable IO device via the virtual link. In some embodiments, the methods comprise applying a security policy in the data plane based on the synchronized flow state. In some embodiments, the other programmable IO device comprises at last one port dedicated to ERSPAN traffic. In some embodiments, the methods comprise forwarding received ERSPAN traffic to the other programable IO device. In some embodiments, the packet is received from a TOR switch.

In a related yet separate aspect, disclosed herein are methods for providing a data plane through a virtual link established between smartNICs. Each of these smartNICs are installed on a multi-smartNIC server via a PCIe interface. The methods being executed by at least one of the smartNICs and comprising: exposing at least one memory bar for communication, the memory bar accessible on a PCIe bus shared between the smartNICs; receiving, from an agent installed on the multi-smartNIC server, a PCIe bus address of at least one memory bar exposed by the other smartNIC; establishing the virtual link with the other smartNIC through PCIe peer-to-peer direct communication via the PCIe bus; providing the data plane by establishing, with the other smartNIC via the virtual link, a data path associated with the data plane; receiving a packet in the data plane destined for the other smartNIC; and forwarding the packet to the other smartNIC via the virtual link. In some embodiments, the methods comprise, once configured by the agent or the driver, communicating directly with the other smartNIC through directing messages over the PCIe bus to establish the virtual link. In some embodiments, the smartNICs comprise at least one ARM core communicably coupled to at least one CPU core of the host device. In some embodiments, the methods comprise processing the packet with the ARM core to determine the destination of the packet. In some embodiments, the smartNICs are installed with LAG across the smartNICs. In some embodiments, the methods comprise determining a MAC address for the other smartNIC via the virtual link. In some embodiments, the methods comprise performing MAC address synchronization with the other smartNIC via the virtual link. In some embodiments, the methods comprise synchronizing a flow state for the data plane with the other smartNIC via the virtual link. In some embodiments, the methods comprise applying a security policy in the data plane based on the synchronized flow state. In some embodiments, the other smartNIC comprises at last one port dedicated to ERSPAN traffic. In some embodiments, the methods comprise forwarding received ERSPAN traffic to the other smartNIC. In some embodiments, the packet is received from a TOR switch.

In a related yet separate aspect, disclosed herein are methods for providing a data plane through a virtual link established between smartNICs. Each of the smartNICs are installed on a multi-smartNIC server via a PCIe interface. These methods are executed by at least one of the smartNICs and comprise: establish a virtual link with the other smartNIC via an external cable connected to a management port of each of the smartNICs; providing the data plane by establishing, with the other smartNIC via the virtual link, a data path associated with the data plane; receiving a packet in the data plane destined for the other smartNIC; and forwarding the packet to the other smartNIC via the virtual link. In some embodiments, the smartNICs comprise at least one ARM core communicably coupled to at least one CPU core of the host device. In some embodiments, the methods comprise processing the packet with the ARM core to determine the destination of the packet. In some embodiments, the smartNICs are installed with LAG across the smartNICs. In some embodiments, the methods comprise determining a MAC address for the other smartNIC via the virtual link. In some embodiments, the methods comprise performing MAC address synchronization with the other smartNIC via the virtual link. In some embodiments, the methods comprise synchronizing a flow state for the data plane with the other smartNIC via the virtual link. In some embodiments, the methods comprise applying a security policy in the data plane based on the synchronized flow state. In some embodiments, the other smartNIC comprises at last one port dedicated to ERSPAN traffic. In some embodiments, the methods comprise forwarding received ERSPAN traffic to the other smartNIC. In some embodiments, the packet is received from a TOR switch.

In a related yet separate aspect, disclosed herein are methods for providing a data plane through a virtual link established between smartNICs. Each of the smartNICs are installed on a multi-smartNIC server via a PCIe interface. These methods are executed by at least one of the smartNICs and comprise: establish a virtual link with the other smartNIC through a PCIe switch configured to connect PCIe interfaces and PCIe peer-to-peer traffic; providing the data plane by establishing, with the other smartNIC via the virtual link, a data path associated with the data plane; receiving a packet in the data plane destined for the other smartNIC; and forwarding the packet to the other smartNIC via the virtual link. In some embodiments, the smartNICs comprise at least one ARM core communicably coupled to at least one CPU core of the host device. In some embodiments, the methods comprise processing the packet with the ARM core to determine the destination of the packet. In some embodiments, the smartNICs are installed with LAG across the smartNICs. In some embodiments, the methods comprise determining a MAC address for the other smartNIC via the virtual link. In some embodiments, the methods comprise performing MAC address synchronization with the other smartNIC via the virtual link. In some embodiments, the methods comprise synchronizing a flow state for the data plane with the other smartNIC via the virtual link. In some embodiments, the methods comprise applying a security policy in the data plane based on the synchronized flow state. In some embodiments, the other smartNIC comprises at last one port dedicated to ERSPAN traffic. In some embodiments, the methods comprise forwarding received ERSPAN traffic to the other smartNIC. In some embodiments, the packet is received from a TOR switch.

Advantages of the described transparent proxy system include distributing smartNIC applications across multiple NIC cards for increased aggregate throughput, improved reliability, and better performance over a single NIC. Moreover, the described transparent proxy system provides a communication channel among these smartNICs allowing for integration of this distributed capability in modern, powerful servers.

It shall be understood that different aspects of the described system can be appreciated individually, collectively, or in combination with each other. Various aspects of the systems described herein may be applied to any of the particular applications set forth below or for any other types of the data processing system disclosed herein. Any description herein concerning the data processing may apply to and be used for any other data processing situations. Additionally, any embodiments disclosed in the context of the data processing system or apparatuses are also applicable to the methods disclosed herein.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
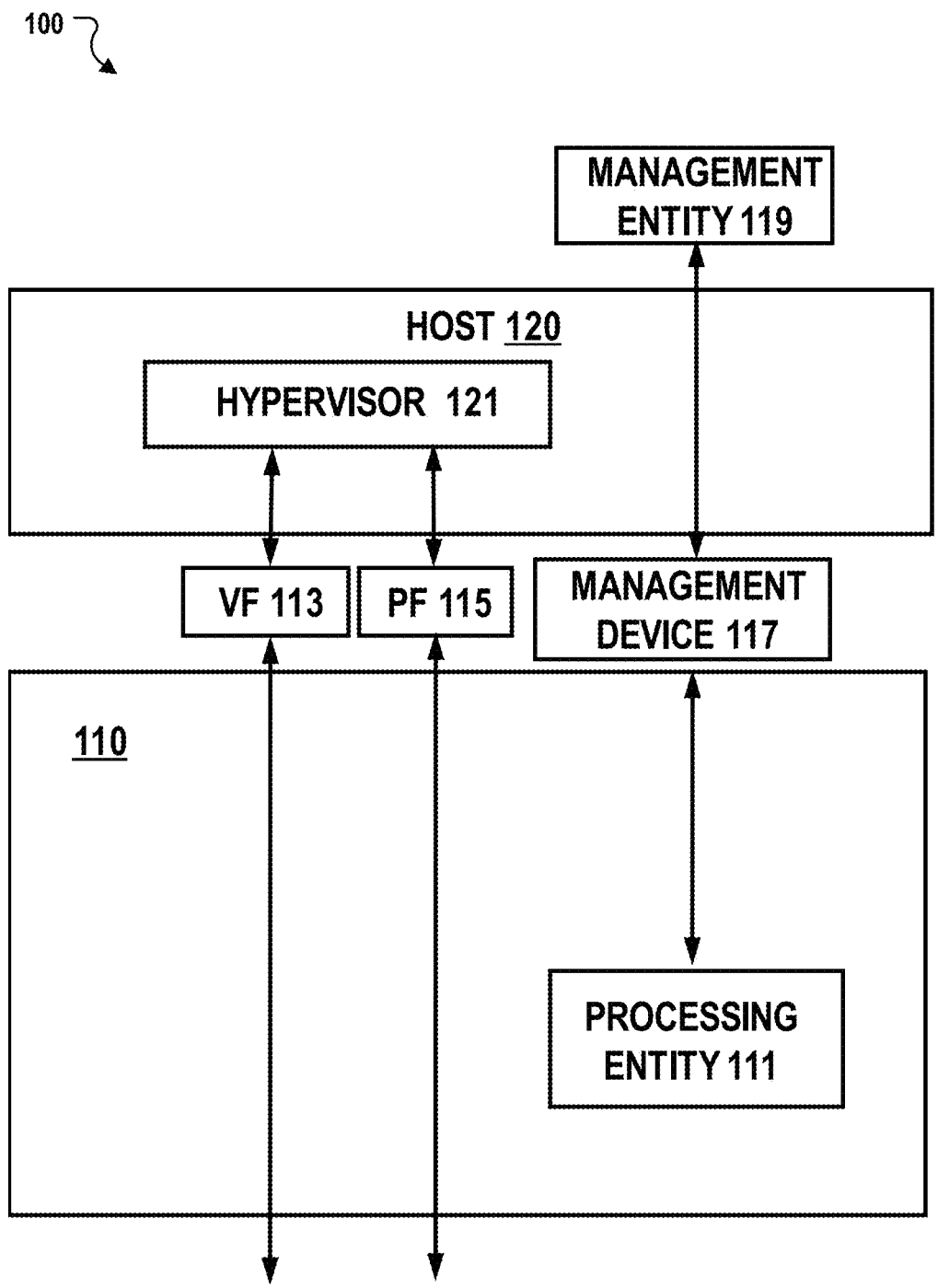
FIG. 1 depicts a non-limiting exemplary computing system architecture that may be employed by embodiments of the present disclosure.

Described herein, in certain embodiments, are programmable IO devices. These programmable IO device are installed on a host device and configured to execute instructions that cause the programmable IO device to perform operations to establish a virtual link between another programmable IO device installed on the host device and provide a data plane using the virtual link. These operations comprise: establishing the virtual link with the other programmable IO device installed on the host device, wherein the virtual link provides a communication channel between the programmable IO devices; providing the data plane by establishing, with the other programmable IO device via the virtual link, a data path associated with the data plane; receiving a packet in the data plane destined for the other programmable IO device; and forwarding the packet to the other programmable IO device via the virtual link.

Also described herein, in certain embodiments, are multi-smartNIC server systems that provides a data plane. Each system comprises: at least two smartNICs installed via a PCIe interface. Each of these smartNICs are configured to: establish a virtual link with the other smartNICs, wherein the virtual link provides a communication channel among the smartNICs; provide a data plane by establishing, with the other smartNICs via the virtual link, a data path associated with the data plane; receive a packet in the data plane destined for one of the other smartNIC; and forward the packet to the other smartNIC via the virtual link.

Also described herein, in certain embodiments, are methods for establishing a virtual link between programmable IO devices installed on a host device. These methods are executed by at least one of the programmable IO devices and comprise: establishing the virtual link with the other programmable IO devices installed on the host device, wherein the virtual link provides a communication channel among the programmable IO devices; providing a data plane by establishing, with the other programmable IO devices via the virtual link, a data path associated with the data plane; receiving a packet in the data plane destined for one of the other programmable IO devices; and forwarding the packet to the other programmable IO device via the virtual link. In some embodiments, each of the programmable IO devices comprises a smartNIC.

Also described herein, in certain embodiments, are methods for providing a data plane through a virtual link established between smartNICs. Each of these smartNICs are installed on a multi-smartNIC server via a PCIe interface. The methods being executed by at least one of the smartNICs and comprising: exposing at least one memory bar for communication, the memory bar accessible on a PCIe bus shared between the smartNICs; receiving, from an agent installed on the multi-smartNIC server, a PCIe bus address of at least one memory bar exposed by the other smartNIC; establishing the virtual link with the other smartNIC through PCIe peer-to-peer direct communication via the PCIe bus; providing the data plane by establishing, with the other smartNIC via the virtual link, a data path associated with the data plane; receiving a packet in the data plane destined for the other smartNIC; and forwarding the packet to the other smartNIC via the virtual link.

Also described herein, in certain embodiments, are methods for providing a data plane through a virtual link established between smartNICs. Each of the smartNICs are installed on a multi-smartNIC server via a PCIe interface. These methods are executed by at least one of the smartNICs and comprise: establish a virtual link with the other smartNIC via an external cable connected to a management port of each of the smartNICs; providing the data plane by establishing, with the other smartNIC via the virtual link, a data path associated with the data plane; receiving a packet in the data plane destined for the other smartNIC; and forwarding the packet to the other smartNIC via the virtual link.

Also described herein, in certain embodiments, are methods for providing a data plane through a virtual link established between smartNICs. Each of the smartNICs are installed on a multi-smartNIC server via a PCIe interface. These methods are executed by at least one of the smartNICs and comprise: establish a virtual link with the other smartNIC through a PCIe switch configured to connect PCIe interfaces and PCIe peer-to-peer traffic; providing the data plane by establishing, with the other smartNIC via the virtual link, a data path associated with the data plane; receiving a packet in the data plane destined for the other smartNIC; and forwarding the packet to the other smartNIC via the virtual link.

Certain Definitions

Unless otherwise defined, all technical terms used herein have the same meaning as commonly understood by one of ordinary skill in the art to which this described system belongs.

As used herein, the singular forms "a," "an," and "the" include plural references unless the context clearly dictates otherwise. Any reference to "or" herein is intended to encompass "and/or" unless otherwise stated.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As referenced herein, terms "component," "system," "interface," "unit," "block," "device" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, PCIe includes a high-speed serial computer expansion bus standard. In some examples, PCIe is a motherboard interface for hardware components, such as, graphics cards, hard drives, solid-state drives (SSDs), Wi-Fi and Ethernet hardware connections. PCIe is based on point-to-point topology, with separate serial links connecting every device to the root complex (host). PCIe has improvements over the older standards (e.g., peripheral component interconnect (PCI), PCI eXtended (PCI-X) and accelerated graphics port (AGP) bus standards), including higher maximum system bus throughput, lower 10 pin count and smaller physical footprint, better performance scaling for bus devices, a more detailed error detection and reporting mechanism (e.g., advanced error reporting, (AER)), and native hot-swap functionality. More recent revisions of the PCIe standard provide hardware support for 10 virtualization.

As used herein, an expansion card includes a printed circuit board that can be inserted into an electrical connector, or expansion slot, on a computer motherboard, backplane or riser card to add functionality to a computer system via an expansion bus. In some embodiments, an expansion bus is a computer bus that moves information between the internal hardware of a computer system, such as the CPU and random access memory (RAM), and peripheral devices such as cache, other memory, data storage or electronic display adapters.

As used herein, a datapath includes a collection of functional units, such as arithmetic logic units or multipliers, which perform data processing operations, registers, and buses. A larger datapath can be made by joining more than one number of datapaths using multiplexer. In some embodiments, offload chaining within a datapath provides for increased processing throughput. For example, a smartNIC may have a 100 gigabits per second (Gbps) PCIe datapath which, if not properly employed by, for example, a host operating system, would not achieve the full 100 Gbps throughput. The counterpart of a datapath is the control path, which may execute on a host CPU and, as such, would not be able to reach the 100 Gbps throughput.

Input Output (IO) Devices

Computing environments may include hosts such as servers, computers running one or more processes, such as virtual machines or containers. The hosts and/or processes may be configured to communicate with other processes or devices over a computing network. The host systems interface with the computing network via IO devices (e.g., smartNICs).

Computer systems interface to IO devices through a specified set of device registers and memory-based data structures. These registers and data structures are usually fixed for a given IO device, allowing a specific device driver program to run on the computer system and control the IO device. In a data communication network, network interfaces are normally fixedly defined control structures, descriptors, registers and the like. Networking data and control structures are memory based and access memory using direct memory access (DMA) semantics. Network systems such as switches, routing devices, receive messages or packets at one of a set of input interfaces and forward them on to one or more of a set of output interfaces. Users typically require that such routing devices operate as quickly as possible in order to keep pace with a high rate of incoming messages. One challenge associated with network systems relates to providing flexible network interfaces so as to adapt to changes in the network device structure and feature set, various protocols, operating systems, applications, and the rapid development of device models.

Communications service providers are investing heavily in large and hyper-scale data centers to deliver content, data processing, and communications services. The applications delivering these services must have access to high-speed storage and networking, be secure, and run in a virtualized environment based on software-defined networking (SDN). Virtualization software, load balancing, encryption, deep packet inspection (DPI), and packet processing all require many CPU cycles and can tie up multiple processor cores, reducing the number of cores available for applications.

Smart Network Interface Card (smartNIC)

A NIC is a PCIe expansion card that plugs into a server or storage box to enable connectivity to an Ethernet network. Traditional NICs support offload of CPU functions, such as checksum and segmentation. However, with the recent tectonic shift in cloud data center networking driven by SDN and network functions virtualization (NFV), a new class of offload NIC is needed. More specifically, the complexity of the server-based networking data plane has increased dramatically with the introduction of overlay tunneling protocols, such as virtual extensible local-area network (VXLAN), and virtual switching with complex actions. Additionally, increasing network interface bandwidths mean that performing these functions in software creates an untenable load on the CPU resources, leaving little or no CPU left over to run applications. Moreover, a key requirement of SDN is that the networking data plane must remain fungible, so fixed-function offload technologies cannot be applied.

Computer systems employ a wide variety of peripheral components or IO devices. An example of a host processor of a computer system connected to IO devices through a component bus defined by PCIe. Device drivers (also referred to drivers) are hardware-specific software which controls the operation of hardware devices connected to computing systems.

Although some portions of the discussion herein may relate, for demonstrative purposes, to a fast or high-speed interconnect infrastructure, to a fast or high-speed interconnect component or adapter with OS bypass capabilities, to a fast or high-speed interconnect card or NIC with OS bypass capabilities, or to a to a fast or high-speed interconnect infrastructure or fabric, embodiments of the described system are not limited in this regard, and may be used in conjunction with other infrastructures, fabrics, components, adapters, host channel adapters, cards or NICs, which may or may not necessarily be fast or high-speed or with OS bypass capabilities. For example, some embodiments of the described system may be utilized in conjunction with Infini-Band (TB) infrastructures, fabrics, components, adapters, host channel adapters, cards or NICs; with Ethernet infrastructures, fabrics, components, adapters, host channel adapters, cards or NICs; with gigabit Ethernet (GEth) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs; with infrastructures, fabrics, components, adapters, host channel adapters, cards or NICs that are connectionless and/or stateless; and/or other suitable hardware.

A smartNIC (also known as an intelligent server adapter (ISA)) goes beyond simple connectivity and implements network traffic processing on the NIC that would necessarily be performed by the CPU in the case of a foundational NIC. SmartNICs can be employed in cloud data center servers to boost performance by offloading operations of the CPUs of the servers by performing network datapath processing through an IO subsystem. For example, the IO subsystem provided through a SmartNIC offloads low-level operations from server CPUs to dramatically increasing network and application performance. By installing smartNICs, communications service providers can deliver significantly better revenue-earning services with a small increase in investment.

In computing, virtualization techniques are used to allow multiple operating systems to simultaneously share processor resources. One such virtualization technique is Single Root IO Virtualization (SR-IOV), which is described in the PCI-SIG Single Root IO Virtualization and Sharing Specifications. A physical IO device may allow multiple virtual machines to use the device concurrently through SR-IOV. In SR-IOV, a physical device may have physical functions (PFs) that allow for input/output operations and device configuration, as well as one or more virtual functions (VFs) that allow for data input/output. According to SR-IOV, a PCIe device can appear to be multiple separate physical PCIe devices. For example, a SR-IOV NIC having a single port can have up to 256 virtual functions, with each virtual function representing a respective NIC port.

In one aspect, a programmable device interface is provided. The device interface may be a highly optimized ring based IO queue interface with an efficient software programming model to deliver high performance with CPU and PCIe bus efficiency. FIG. 1 shows a block diagram of an exemplary computing system architecture 100, in accordance with embodiments of the described system. A hypervisor 121 on the host computing system 120 may interact with the physical IO device 110 using the PFs 115 and one or more VFs 113. As illustrated, the computing system 120 may comprise a management device 117 configured for management of the interface devices. The management device 117 may be in communication with a processing entity 111 (e.g., ARM cores) and a management entity 119 (e.g., management virtual machine system). It should be noted that the illustrated computing system is only an example mechanism, without suggesting any limitation as to the scope of the described system. The provided programmable IO interface and methods can be applied to any operating-system-level virtualization (e.g., container and docker system) or machine level virtualization or computing system without virtualization features.

The hypervisor 121 generally provides operating system functionality (e.g., process creation and control, file system process threads, etc.) as well as CPU scheduling and memory management for the host. In some cases, the host computing system 120 may include programs that implement a machine emulator and virtualizer. The machine emulator and virtualizer may assist in virtualizing respective computer IO devices in virtual machines, such as virtualized hard disks, compact disk drives, and NICs. Virtio is a virtualization standard for implementing virtual IO devices in a virtual machine and may be considered as an abstraction for a set of common emulated devices in a hypervisor.

The provided programmable IO device interface mechanism allows for native hardware speeds when using the device emulator. The programmable IO device interface allows the host system to interface with the IO device with existing device drivers without reconfiguration or modification. In some cases, the VF device, PF device and management device may have similar driver interface such that such devices can be supported by a single driver. Such devices may, in some cases, be referred to as Ethernet devices.

The IO device 110 may provide a variety of services and/or functionality to an operating system operating as a host on computing system 120. For example, the IO device may provide network connectivity functions to the computing system, coprocessor functionality (e.g., graphics processing, encryption/decryption, database processing, etc.) and the like. The IO device 110 may interface with other components in the computing system 100 via, for example, a PCIe bus.

As mentioned above, SR-IOV specification enables a single root function (for example, a single Ethernet port) to appear to virtual machines as multiple physical devices. A physical IO device with SR-IOV capabilities may be configured to appear in the PCI configuration space as multiple functions. The SR-IOV specification supports physical functions and virtual functions.

Physical functions are full PCIe devices that may be discovered, managed, and configured as normal PCI devices. Physical functions configured and manage the SR-IOV functionality by assigning virtual functions. The IO device may expose one or more physical functions (PFs) 115 to a host computing system 120 or hypervisor 121. The PFs 115 may be full-featured PCIe devices that include all configuration resources and capabilities for the IO device. In some cases, the PFs may be PCIe functions that include SR-IOV extended capability, which facilitates the configuration or management of the IO device. The PF device is essentially a base controller of the Ethernet device. The PF device may be configured with up to 256 VFs. In some cases, the PFs may include extended operations such as allocating, configuring and freeing a VF, discovering hardware capabilities of the VF, such as Receive Side Scaling (RSS), discovering hardware resources of the VF, such as number of queues and interrupts resources, configuring the hardware resources and features of a VF, saving and restoring hardware state and the like. In some instances, the PF device may be configured as a boot device which may present an Option ROM base address registers (BAR).

The IO device may also provide one or more virtual functions (VFs) 113. The VFs may be lightweight PCIe functions that contain the resources necessary for data movement but may have a minimized set of configuration resources. In some cases, the VFs may include lightweight PCIe functions that support SR-IOV. To use SR-IOV devices in a virtualized system, the hardware may be configured to create multiple VFs. These VFs may be made available to the hypervisor for allocations to virtual machines. The VFs may be manipulated (e.g., created, configured, monitored, or destroyed) for example, by the SR-IOV physical function device. In some cases, each of the multiple VFs is configured with one or more BARs to map NIC resources to the host system. A VF may map one or more LIFs or port, which are used in the IO device for forwarding and transaction identification. A LIF may belong to only one VF. Within a physical device, all virtual functions may have an identical BAR resource layout, stacked sequentially in host PCIe address space. The IO device PCIe interface logic may be programmed to map control registers and NIC memory regions with programmable access permissions (e.g., read, write, execute) to the VF BARs.

The IO device 110 may comprise a management device 117 for management of the IO device. The management device 117 may not have direct access to the network uplink ports. The management device may be in communication with the processing entity 111. For example, the traffic on the management device may be steered to internal receive queues for processing by the management software on the processing entity 111. In some cases, the management device may be made available to pass through the hypervisor to a management entity 119 such as a management virtual machine. For example, the management device 117 may be assigned a device ID different from the PF device 115, such that a device driver in the hypervisor may be released for the PF device when the PF device does not claim the management device.

Figure 2:
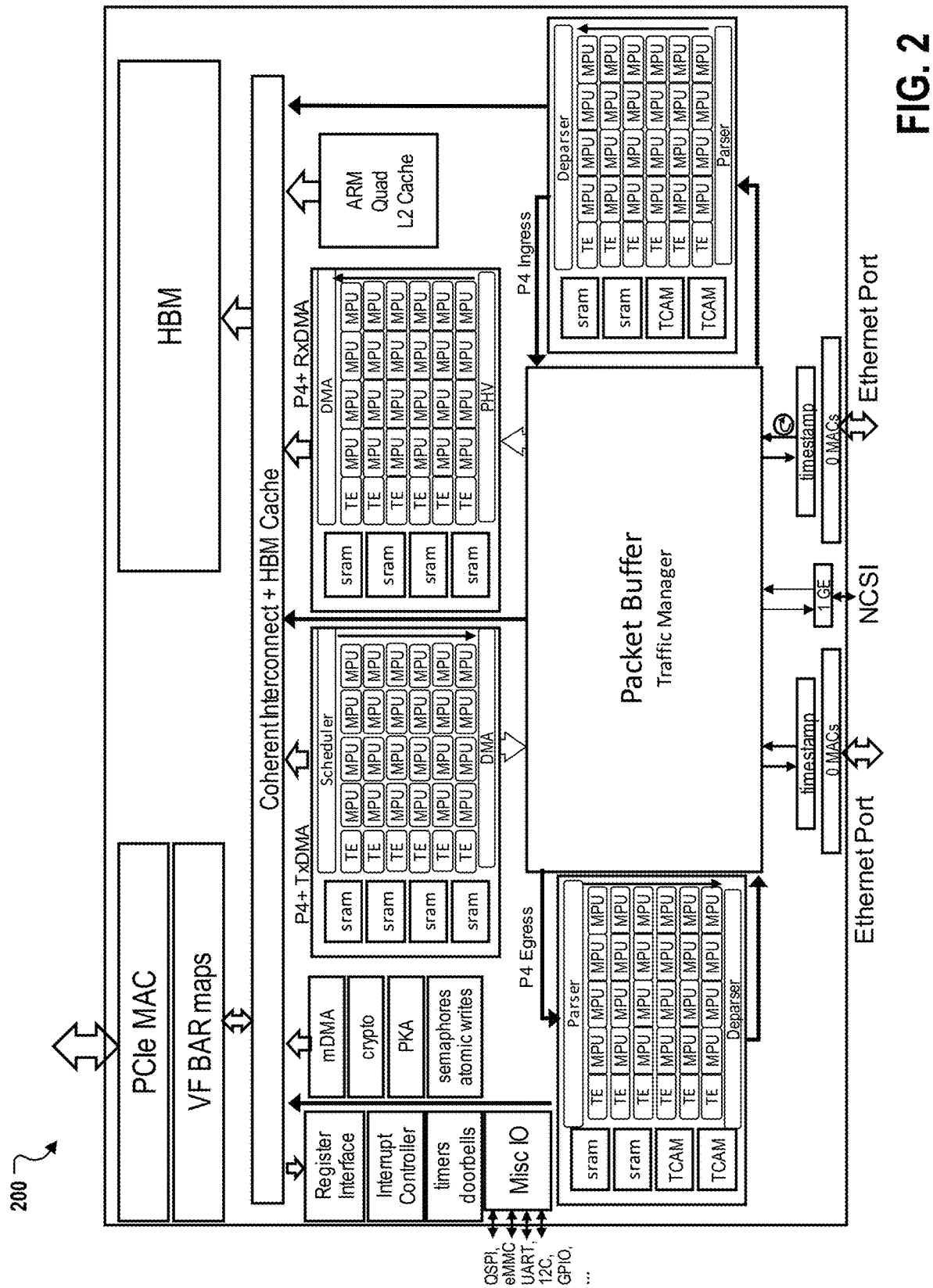
FIG. 2 depicts a non-limiting exemplary configurations of multiples match processing units (MPUs) for executing a program that may be employed by embodiments of the present disclosure.

FIG. 2 shows another exemplary IO device system 200 with described programmable device interface, in accordance with some embodiments of the described system. The system 200 serves as an example of implementing the P4 and extended P4 pipelines and various other functions to provide an improved network performance. In some cases, the device interface may have improved network performance by: not requiring PCIe bus register reads in the packet transmit or receive path; providing a single posted (non-blocking) PCIe bus register write for packet transmit; supporting for message signaled interrupts (MSI) and message signaled interrupts-extended (MSI-X) modes with driver-configurable interrupt moderation for high-performance interrupt processing; supporting IO queues with outstanding requests (e.g., up to 64 k) per queue; transmitting transmission control protocol (TCP) segmentation Offload (TSO) with improved send size; providing TCP/User Datagram Protocol (UDP) checksum offload; supporting for a variable number of Receive Queues to support industry standard Receive Side Scaling (RSS); supporting SR-IOV with up to 255 virtual functions.

The IO device system 200 may be the same IO device as described in FIG. 1 and implemented as a rack mounted device and comprise one or more ASICs and/or boards with components mounted thereon. As shown in FIG. 2, the system 200 may comprise four ARM processors with coherent L1 and L2 caches, a shared local memory system, flash non-volatile memory, DMA engines, and miscellaneous IO devices for operation and debug. The ARM processors may observe and control all NIC resources via an address map. The ARM processor may implement the P4 pipeline and the extended P4 pipeline as described later herein.

The system may comprise a host interface and a network interface. The host interface may be configured to provide communication link(s) with one or more hosts (e.g., host servers). The host interface block may also observe regions of the address space via PCIe BAR maps to expose NIC functions to a host system. In an example, the address map may be initially created according to the principles of ARM memory maps, ARM limited, which provides SOC addressing guidelines for a 34-bit memory map.

The network interface may support network connections or uplinks with a computing network that may be, for example, a local area network, wide area network and various others as described elsewhere herein. The physical link may be controlled by a management agent (e.g., management entity 119) through the device driver. For example, the physical link may be configured via a "virtual link" associated with a device LIF.

Memory transactions in the system 200, including host memory, high bandwidth memory (HBM), and registers may be connected via a coherent network on a chip (NOC) based on IP from an external Systems. The NOC may provide cache coherent interconnect between the NOC masters, including P4 pipeline, extended P4 pipeline, DMA, PCIe, and ARM. The interconnect may distribute HBM memory transactions across a plurality (e.g., 16) of HBM interfaces using a programmable hash algorithm. All traffic targeting HBM may be stored in the NOC cache (e.g., 1 MB cache). The NOC cache may be kept coherent with the ARM caches. The NOC cache may be used to aggregate HBM write transactions which may be smaller than the cache line (e.g., size of 64 bytes), as the HBM is not efficient when processing small writes. The NOC cache may have high bandwidth, supporting up to 3.2 Tb/s operation as it fronts the 1.6 Tb/s HBM.

The system may comprise an internal HBM memory system for running Linux, storing large data structures such as flow tables and other analytics, and providing buffering resources for advanced features including TCP termination and proxy, deep packet inspection, storage offloads, and connected FPGA functions. The memory system may comprise an HBM module which may support 4 GB capacity or 8 GB capacity, depending on package and HBM.

As mentioned above, the system may comprise a PCIe host interface. The PCIe host interface may support a bandwidth of, for example, 100 Gb/s per PCIe connection (e.g., dual PCIe Gen4×8 or single PCIe Gen3×16). A mechanism or a scheme to map resources available at the IO device to memory-mapped control regions associated with the virtual IO devices may be implemented by using a pool of configurable PCIe BARs coupled with a resource mapping table to store mapping information for each virtual IO device. The IO resources provided by the IO device may be mapped to host addresses in the framework of the PCIe standard such that the same device drivers that are utilized to communicate with physical PCIe devices may be utilized to communicate with corresponding virtual PCIe devices.

The IO device interface may comprise programmable registers. These registers may comprise, for example, PCIe BARs that may include a first memory BAR containing device resources (e.g., device command registers, doorbell registers, interrupt control registers, interrupt status registers, MSI-X interrupt table, MSI-X interrupt pending bit array, etc.) a second BAR containing device doorbells pages, and a third BAR for mapping a controller memory buffer.

The device command registers are a set of registers used for submitting administrative commands to the hardware or firmware. For example, the device command registers may specify a single-64 byte command and a single 16-byte completion response. This register interface may allow for a single command outstanding at a time. The device command doorbell is a special purpose doorbell used to signal a command is ready in the device command registers.

The second BAR may contain doorbells pages. The general form of the second BAR may contain multiple LIFs with multiple doorbell pages per LIF. A network device (i.e., IO device) may have at least one LIF with at least one doorbell page. Any combination of single/many LIFs with single/many Doorbell Pages is possible and the driver may be prepared to identify and operate the different combinations. In an example, doorbell pages may be presented on a 4 k stride by default to match a common system page size. The stride between doorbell pages may be adjusted in the virtual function device 113 to match the system page size configuration setting in the SR-IOV capability header in the parent physical function device 115. This page size separation allows protected independent direct access to a set of doorbell registers by processes by allowing each process to map and access a doorbell page dedicated for its use. Each page may provide the doorbell resources needed to operate the datapath queue resources for a LIF, while protecting access to those resources from another process.

The doorbell register may be written by software to adjust a queue's producer index. Adjusting the producer index is the mechanism to transfer ownership of queue entries in the queue descriptor ring to the hardware. Some doorbell types, such as the Admin Queue, Ethernet Transmit Queue, and RDMA Send Queue, may cause the hardware queue to schedule further processing of the descriptors available in the queue. Other queue types, such as Completion Queues and Receive Queues, may require no further action from the hardware queue after updating the producer index.

The interrupt status register may contain a bit for each interrupt resource of the device. The register may have a bit set indicating the corresponding interrupt resource has asserted its interrupt. For example, bit 0 in Interrupt Status indicates interrupt resource 0 is asserted, bit 1 indicates interrupt resource 1 is asserted.

The controller memory buffer may be a region of general-purpose memory resident on the IO device. The user or kernel driver may map in this controller memory BAR, and build descriptor rings, descriptors, and/or payload data in the region. A bit may be added in the descriptor to select whether the descriptor address field is interpreted as a host memory address, or as an offset relative to the beginning of the device controller memory window. The extended P4 program may set a designated bit (e.g., bit 63) of the address if it is a host address or clear the bit and add the device controller memory base address to the offset when building the TxDMA operations for the DMA stage.

The MSI-X resources may be mapped through the first BAR and the format may be described by the PCIe Base Specification. The MSI-X interrupt table is a region of control registers that allows an OS to program MSI-X interrupt vectors on behalf of the driver.

The MSI-X Interrupt Pending Bit Array (PBA) is an array of bits, one for each MSI-X interrupt supported by the device.

The IO device interface may support programmable DMA register tables, descriptor formats, and control register formats, allowing specialized VF interfaces and user defined behaviors. The IO device PCIe interface logic may be programmed to map control registers and NIC memory regions with programmable access permissions (e.g., read, write, execute) to the VF BARs.

Match Processing Unit

In an aspect of the described system, an MPU is provided to process a data structure. The data structure may comprise various types such as data packet, a management token, administrative command from a host, a processing token, a descriptor ring and various others. The MPU may be configured to perform various operations according to the type of data being processed or different purposes. For example, the operations may include table-based actions for processing packets, table maintenance operations such as writing a timestamp to a table or harvesting table data for export, administrative operations such as creating new queues or memory maps, gathering statistics, and various other operations such as initiating a bulk data processing that may result in writing any type of modified data to the host memory.

In some embodiments, the MPU may process a data structure in order to update the memory-based data structure or initiate an event. The event may or may not relate to modifying or updating a packet. For instance, the event may be administrative operations such as creating new queues or memory maps, gathering statistics, initiating a bulk data processing that may result in writing any type of modified data to the host memory, or performing calculations on descriptor rings, scatter gather lists (SGLs).

Figure 3:
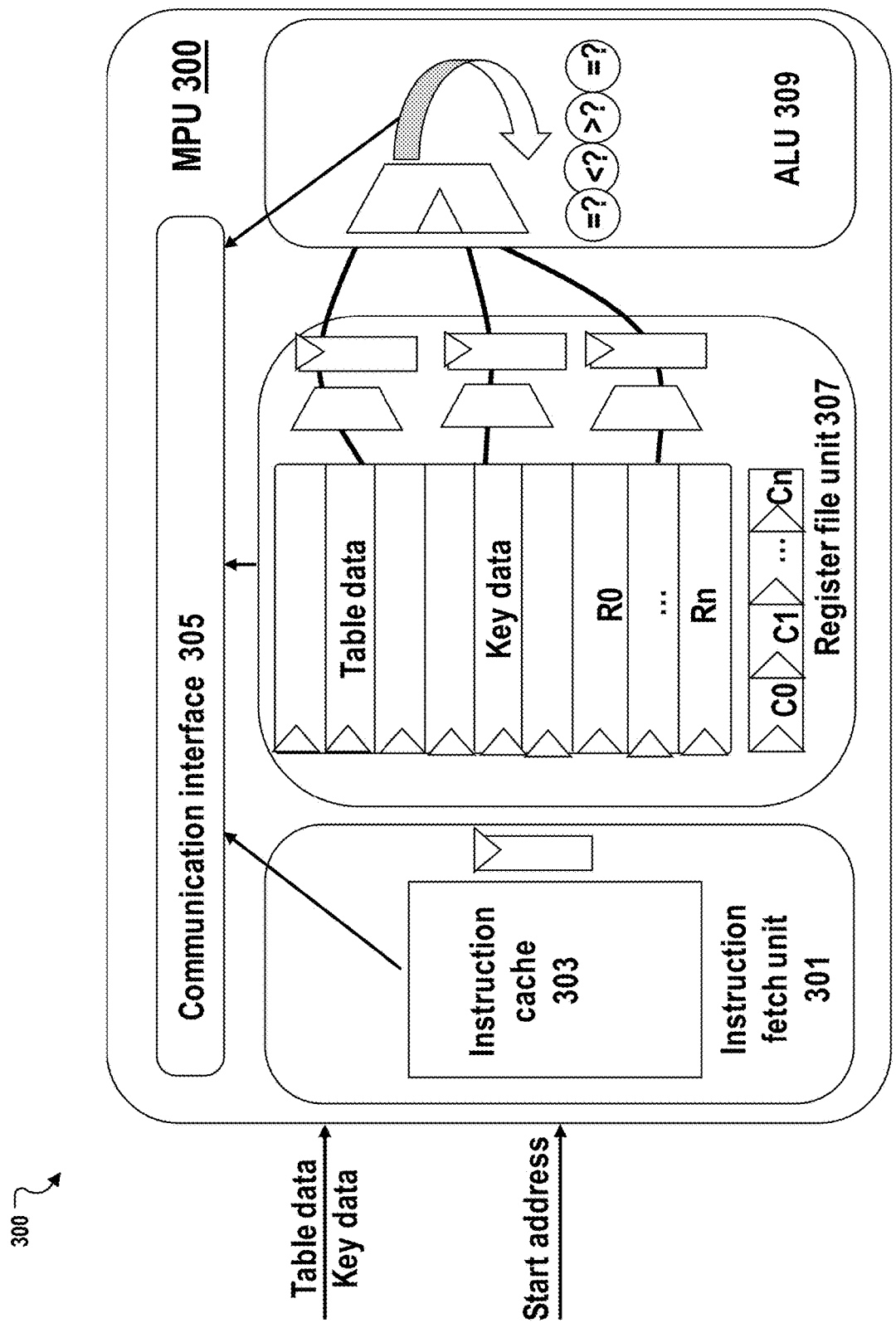
FIG. 3 depicts a non-limiting exemplary MPU that may be employed by embodiments of the present disclosure.

FIG. 3 shows a block diagram of an MPU 300, in accordance with embodiments of the described system. In some embodiments, the MPU unit 300 may comprise multiple functional units, memories and at least a register file. For example, the MPU unit may comprise an instruction fetch unit 301, a register file unit 307, a communication interface 305, arithmetic logic units (ALUs) 309 and various other functional units.

In the illustrated example, the MPU unit 300 may comprise a write port or communication interface 305 allowing for memory read/write operations. For instance, the communication interface may support packets written to or read from an external memory (e.g., HBM of a host device) or an internal static random-access memory (SRAM). The communication interface 305 may employ any suitable protocol such as Advanced Microcontroller Bus Architecture (AMBA) Advanced extensible Interface (AXI) protocol. AXI is a bus protocol for a high-speed/high-end on-chip bus protocol and has channels associated with read, write, address, and write response, which are respectively separated, individually operated, and have transaction properties such as multiple-outstanding address or write data interleaving. The AXI interface 305 may include features that support for unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as Advanced High-performance Bus (AHB) protocol or Advanced Peripheral Bus (APB) protocol in addition to the AXI protocol.

The MPU 300 may comprise an instruction fetch unit 301 configured to fetch instruction set from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. Details about the table engine are described later herein. In some embodiments, the instruction fetch unit 301 may comprise an instruction cache 303 for storing one or more programs. In some cases, the one or more programs may be loaded into the instruction cache 303 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 305. This provides flexibility to allow for executing different programs associated with different types of data using the same processing unit. In an example, when a management packet header vector (PHV) injected into the pipeline, for example to perform administrative table direct memory access (DMA) operations or entry aging functions (i.e., adding timestamps), one of the management MPU programs may be loaded to the instruction cache to execute the management function. The instruction cache 303 can be implemented using various types of memories such as one or more SRAMs.

The one or more programs can be any programs such as P4 programs related to reading table, building headers, DMA to/from memory regions in HBM or in the host device and various other actions. The one or more programs can be executed in any stage of a pipeline as described elsewhere herein.

The MPU 300 may comprise a register file unit 307 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 307 may comprise a plurality of general-purpose registers (e.g., R0, R1, Rn) which may be initially loaded with metadata values then later used to store temporary variables within execution of a program until completion of the program. For example, the register file unit 307 may be used to store SRAM addresses, ternary content accessible memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In one embodiment, each register of the register file is 64 bits and may be initially loaded with special metadata values such as hash value from table, lookup, packet size, PHV timestamp, programmable table constant and the like, respectively.

In some embodiments, the register file unit 307 may also comprise comparator flags unit (e.g., C0, C1, . . . Cn) configured to store comparator flags. The comparator flags can be set by calculation results generated by the ALU which in return is compared with constant values in an encoded instruction to determine a conditional branch instruction. In an embodiment, the MPU may comprise eight one-bit comparator flags. However, it should be noted that MPU may comprise any number of comparator flag units each of which may have any suitable length.

The MPU 300 may comprise one or more functional units such as the ALU 309. The ALU may support arithmetic and logical operations on the values stored in the register file unit 307. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, the ALU may be configured to perform calculations on descriptor rings, scatter gather lists (SGLs), and control data structures loaded into the general-purpose registers from the host memory.

The MPU 300 may comprise various other functional units such as meters, counters, action insert unit and the like. For example, the ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be remarked as a result of overflowing the base band. This information might be used later to direct the packet to a different queue, where it may be more subject to delay or dropping in case of congestion. The counter may be implemented by the MPU instructions. The MPU may comprise one or more types of counters for different purposes. For example, the MPU may comprise performance counters to count MPU stalls. The action insert unit may be configured to push the register file result back to the PHV for header field modifications.

The MPU may be capable of locking a table. In some case, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table addresses, for example, one for the previous table write-back and another address lock for the current MPU program.

MPU Pipelining

A single MPU may be configured to execute instructions of a program until completion of the program. Alternatively, or additionally, multiple MPUs may be configured to execute a program. In some embodiments, a table result may be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Any number of MPUs may be used for executing a program in order to meet a desirable performance. For instance, at least two, three, four, five, six, seven, eight, nine, or ten MPUs may be used to execute a program. Each MPU may execute at least a portion of the program or a subset of the instruction set. The multiple MPUs may perform the execution simultaneously or sequentially. Each MPU may or may not perform the same number of instructions. The configurations may be determined according to the length of program (i.e., number of instructions, cycles) and/or number of available MPUs. In some case, the configuration may be determined by an application instruction received from a main memory of a host device operably coupled to the plurality of MPUs.

P4 Pipelines

Figure 4:
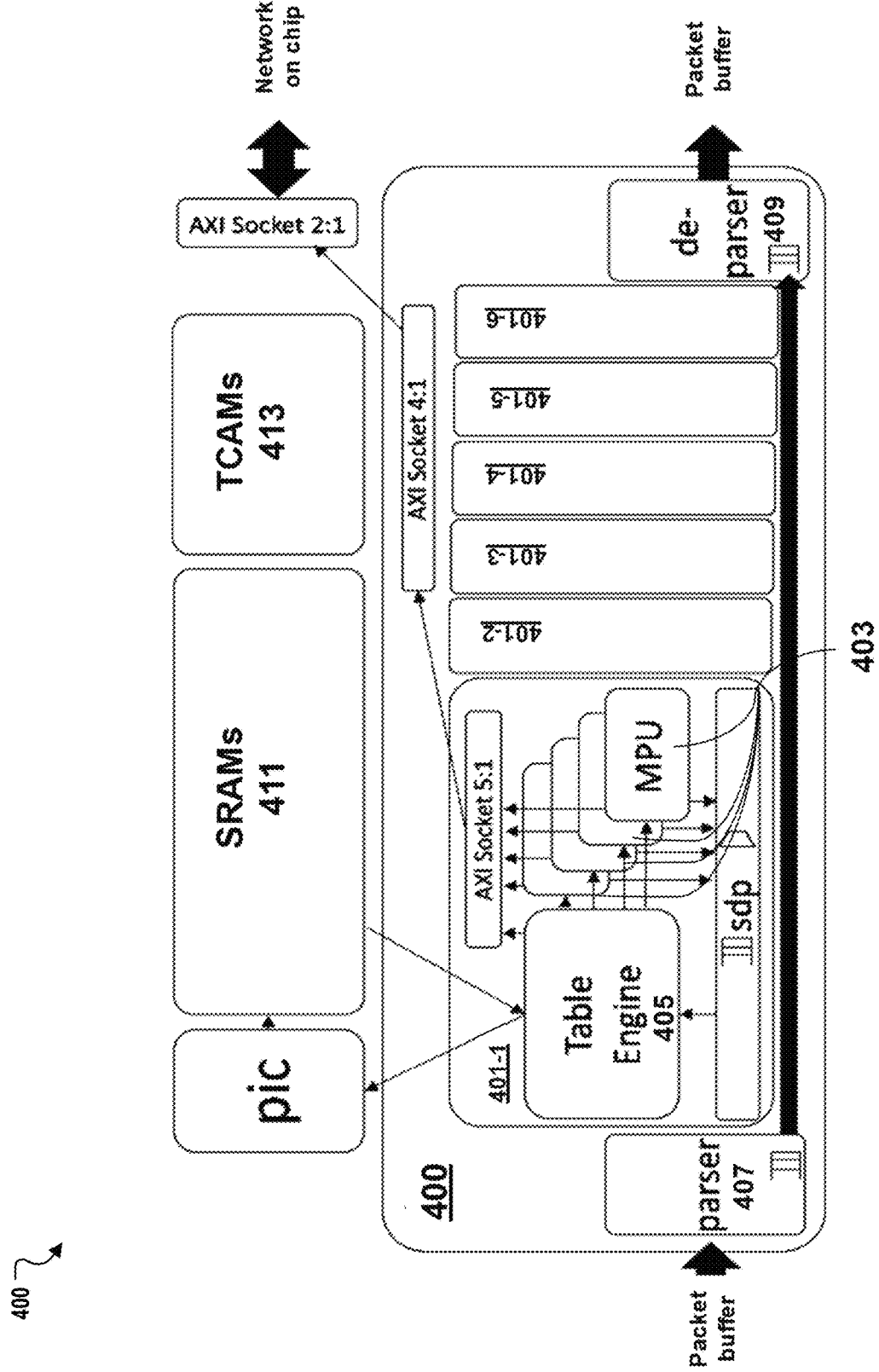
FIG. 4 depicts a non-limiting exemplary P4 ingress or egress pipeline (PIP pipeline) that may be employed by embodiments of the present disclosure.

In one aspect, a flexible, high performance match action pipeline which can execute a wide range of P4 programs is provided. The P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others. FIG. 4 shows a block diagram of an exemplary P4 ingress or egress pipeline (PIP pipeline) 400 in accordance with embodiments of the described system.

In some embodiments, the described system may support a match+action pipeline. The programmer or compiler may decompose the packet processing program into a set of dependent or independent table lookup and action processing stages (i.e., match+action) which are mapped onto the table engine and MPU stages respectively. The match+action pipeline may comprise a plurality of stages. For example, a packet entering the pipeline may be first parsed by a parser (e.g., parser 507) according to the packet header stack specified by a P4 program. This parsed representation of the packet may be referred to as parsed header vector. The parsed header vector may then be passed through stages (e.g., stages 401-1, 401-2, 401-3, 401-4, 401-5, 401-6) of ingress match+action pipeline. In some embodiments, each stage is configured to match one or more parsed header vector fields to tables, then updates the packet header vector (PHV) and/or table entries according to the actions specified by the P4 program. In some instances, if the required number of stages exceeds the implemented number of stages, a packet may be recirculated for additional processing. In some cases, the packet payload may travel in a separate first-in-first-out (FIFO) queue until it is reassembled with its PHV in the de-parser (e.g., de-parser 409). The de-parser may rewrite the original packet according to the PHV fields which have been modified (e.g., added, removed, or updated). In some cases, the packet processed by the ingress pipeline may be placed in a packet buffer for scheduling and possible replication. In some cases, once the packet is scheduled and leaves the packet buffer, it may be parsed again to create an egress parsed header vector. The egress parsed header vector may be passed through a sequence of stages of match+action pipeline in a similar fashion of the ingress match+action pipeline, after which a final de-parser operation may be executed before the packet is sent to its destination interface or recirculated for additional processing.

In some embodiments, the ingress pipeline and egress pipeline may be implemented using the same physical block or processing unit pipeline. In some embodiments, the PIP pipeline 400 may comprise at least one parser 407 and at least one de-parser 409. The PIP pipeline 400 may comprise multiple parsers and/or multiple de-parsers. The parser and/or de-parser may be a P4 compliant programmable parser or de-parser. In some cases, the parser may be configured to extract packet header fields according to P4 header definitions and place them in the packet header vector (PHV). The parser may select from any fields within the packet and align the information from the selected fields to create a packet header vector. In some cases, after passing through a pipeline of match+action stages, the de-parser block may be configured to rewrite the original packet according to the updated PHV.

The packet header vector (PHV) produced by the parser may have any size or length. For example, the PHV may be a least 512 bits, 256 bits, 128 bits, 64 bits, 32 bits, 8 bits or 4 bits. In some cases, when a long PHV (e.g., 6 Kb) is desired to contain all relevant header fields and metadata, a single PHV may be time division multiplexed (TDM) across several cycles. This TDM capability provides benefit allowing the described system to support variable length PHVs, including very long PHVs to enable complex features. A PHV length may vary as the packet passes through the match+action stages.

The PIP pipeline may comprise a plurality of match+action stages. After the parser 407 produces the PHV, the PHV may be passed through the ingress match+action stages. In some embodiments, the PIP pipeline may be implemented using multiple stage units 401-1, 401-2, 401-3, 401-4, 401-5, 401-6, each of which may comprise a table engine 405 and multiple MPUs 403. The MPU 403 can be same as the MPU as described in FIG. 4. In the illustrated example, four MPUs are used in one stage unit. However, any other number of MPUs, such as at least one, two, three, four, five, six, seven, eight, nine, or ten can be utilized or grouped with a table engine.

A table engine 405 may be configured to support per-stage table match. For example, the table engine 405 may be configured to hash, lookup, and/or compare keys to table entries. The table engine 405 may be configured to control table match process by controlling the address and size of the table, PHV fields to use as a lookup key, and MPU instruction vector which defines the P4 program associated with the table. A table result produced by the table engine may be distributed to the multiple MPUs 403.

The table engine 405 may be configured to control a table selection. In some cases, upon entering a stage, the PHV may be examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on packet type or protocols (e.g., IPv4, IPv6 and Multiprotocol Label Switching (MPLS)) or the next table ID as determined by the preceding stage. In some cases, the incoming PHV may be analyzed by the table selection logic, which then generates a table selection key and compares the result using a TCAM to select the active tables. The table selection Key may be used to drive table hash generation, table data comparison, and associated data into the MPUs.

In some embodiments, the table engine 405 may comprise a hash generation unit. The hash generation unit may be configured to generate a hash result off a PHV input and the hash result may be used to conduct a DMA read from a DRAM or SRAM array. In an example, the input to the hash generation unit may be masked according to which bits in the table selection key contribute to the hash entropy. In some cases, the same mask may be used by the table engine for comparison with the returning SRAM read data. In some instances, the hash result may be scaled according to the table size, then the table base offset may be added to create the memory index. The memory index may be sent to the DRAM or SRAM array and to perform the read.

In some cases, the table engine 405 may comprise a TCAM control unit. The TCAM control unit may be configured to allocate memory to store multiple TCAM search tables. In an example, a PHV table selection key may be directed to a TCAM search stage before a SRAM lookup. TCAM search tables can be configured to be up to 1024 bits wide and as deep as TCAM resources permit. In some cases, multiple TCAM tables may be carved from the shared quadrant TCAM resources. The TCAM control unit may be configured to allocate TCAMs to individual stages so that to prevent TCAM resource conflicts or allocate TCAM into multiple search tables within a stage. The TCAM search index results may be forwarded to the table engine for SRAM lookups.

The PIP pipeline 400 may comprise multiple stage units 401-1, 401-2, 401-3, 401-4, 401-5, 401-6. The PIP pipeline may comprise any number of stage units such as at least two, three, four, five, six, seven, eight, nine, ten sage units that can be used within the PIP pipeline. In the illustrated example, six match+action stages units 401-1, 401-2, 401-3, 401-4, 401-5, 401-6 are grouped into a set. The set of stages units may share a common set of SRAMs 411 and TCAMs 413. The SRAMs 411 and TCAMs 413 may be component of the PIP pipeline. This arrangement may allow the six stage units to divide match table resources in any suitable proportion which provides convenience to the compiler and easing the complier's task of resource mapping. Any suitable number of SRAM resources and any suitable number of TCAM resources may be used by each PIP pipeline. For example, the illustrated PIP pipeline may be coupled to ten SRAM resources and four or eight TCAM resources. In some instances, TCAMs may be fused vertically or horizontally for a wider or deeper search.

Extended P4 Pipelines

In one aspect, the described system may support an extended P4 programmable pipeline to allow for direct interfacing with the host driver. The extended P4 programmable pipeline implements the IO device interface as described above. For example, the P4 programmed DMA interfaces may be directly coupled to the host virtual functions (VFs) as well as ARM, CPU, or offload engine interfaces. The extended P4 pipeline may handle required DMA operations and loops. The extended P4 pipeline may include features, including but not limited to, stateless NIC offloads such as TCP segmentation offload (TSO) and Receive Side Scaling (RSS); storage exchange table-style transaction servicing in the extended P4 pipeline; fine grained load balancing decisions that can be extended to individual data structures of performance critical applications, such as DPDK or key value matching; TCP flow termination and initiation for proxy services; RDMA over converged Ethernet (RoCE) and similar remote direct memory access (RDMA) protocol support; custom descriptor and SGL formats can be specified in P4 to match data structures of performance critical applications; new device and VF behaviors can be modelled using P4 programs coupled with host driver development, and various other features.

Data may be transmitted between the packetized domain in the P4 pipeline to/from the memory transaction domain in the host and NIC memory systems. This packet to memory transaction conversion may be performed by the extended P4 pipelines that include DMA write (TxDMA) and/or DMA read (RxDMA) operations. The extended P4 pipeline includes TxDMA may also be referred to as Tx P4 or TxDMA and the extended P4 pipeline includes RxDMA may also be referred to as Rx P4 throughout this specification. The extended P4 pipelines may comprise the same match+action stages in the P4 pipeline, and a payload DMA stage at the end of the pipeline. Packets may be segmented or reassembled into data buffers or memory regions (e.g., RDMA registered memory) according to the extended P4 programs. The payload DMA stage may be a P4 extension which enables the programmable P4 network pipeline extended to the host memory system and driver interface. This P4 extension allows custom data structures and applications interactions to be tailored to application or container needs.

The match table utilized in the extended P4 pipeline may be programmable tables. A stage of an extended P4 pipeline may include multiple programmable tables which may exist in SRAM, NIC DRAM, or host memory. For example, host memory structures may include descriptor rings, SGLs, and control data structures which can be read into the register file unit of the MPU for calculations. The MPU may add PHV commands to control DMA operations to and from host and NIC memory and insert DMA commands into the PHV for execution by the payload DMA stage. The extended P4 programs may include, for example, completion queue events, interrupts, timer set, and control register writes and various other programs.

Example Topologies

In some embodiments, the described system employs a virtual link for control or data channel communication among programmable IO devices (e.g., SmartNICs) installed on a server. The virtual link supports the services and features that require communication between the linked programmable IO devices. Examples of such services and features include, but are not limited to, inband communication with link aggregation groups (LAG) across the devices; state synchronization for network, security, and storage services; and encapsulated remote switched port analyzer (ERSPAN) traffic redirection for efficient use of links. Inband communication or signaling includes the sending of control information within the same band or channel used for data. Moreover, the virtual link provides for decreased packet loss and increased traffic throughput as the programmable IO devices can use the established communication path to share information (e.g., received packets and data path information).

Multi-smartNIC Servers

Figure 5A:
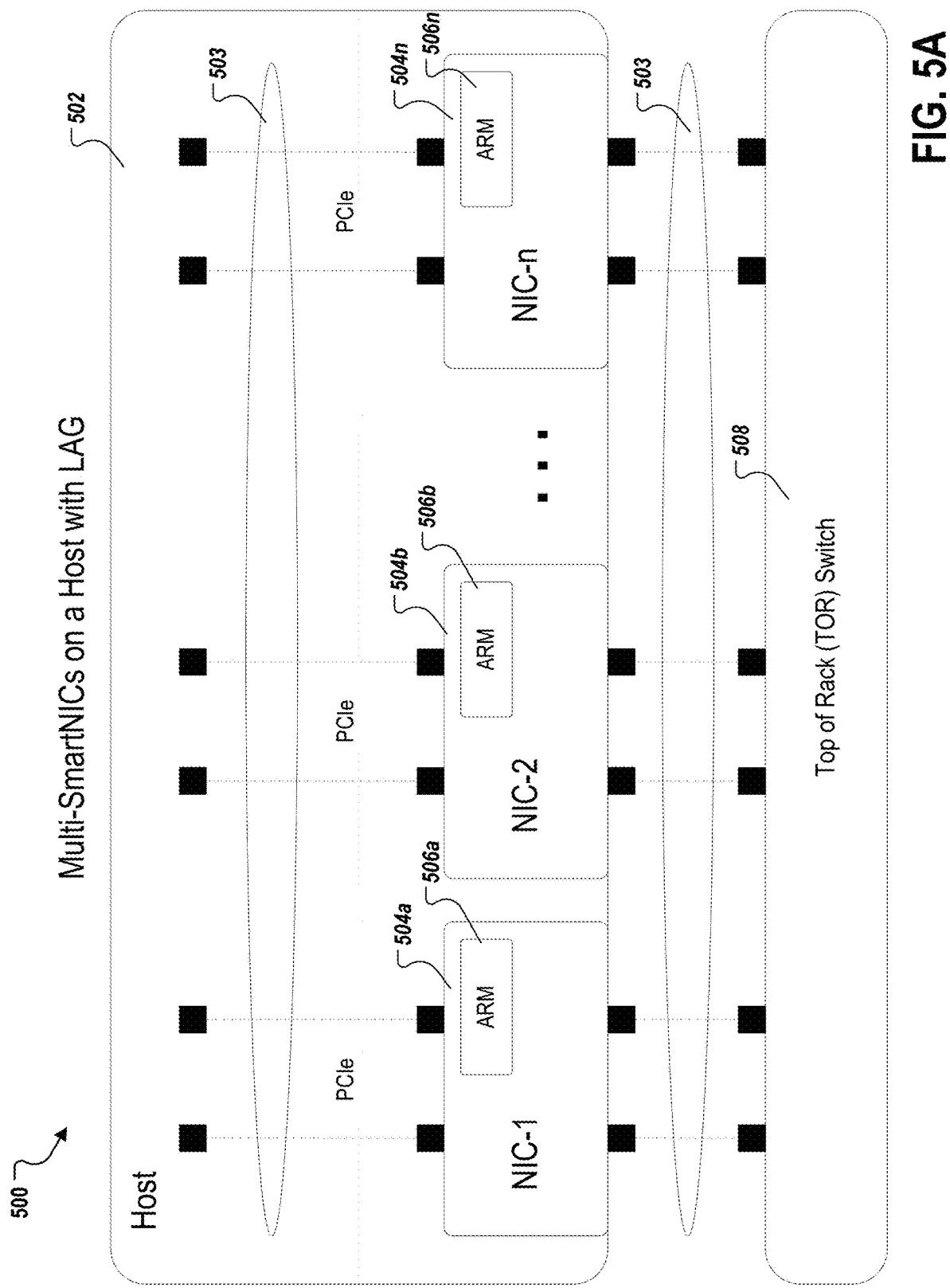
FIGS. 5A-5C depict exemplary topologies where a virtual link among smartNICs may be employed.
Figure 5B:
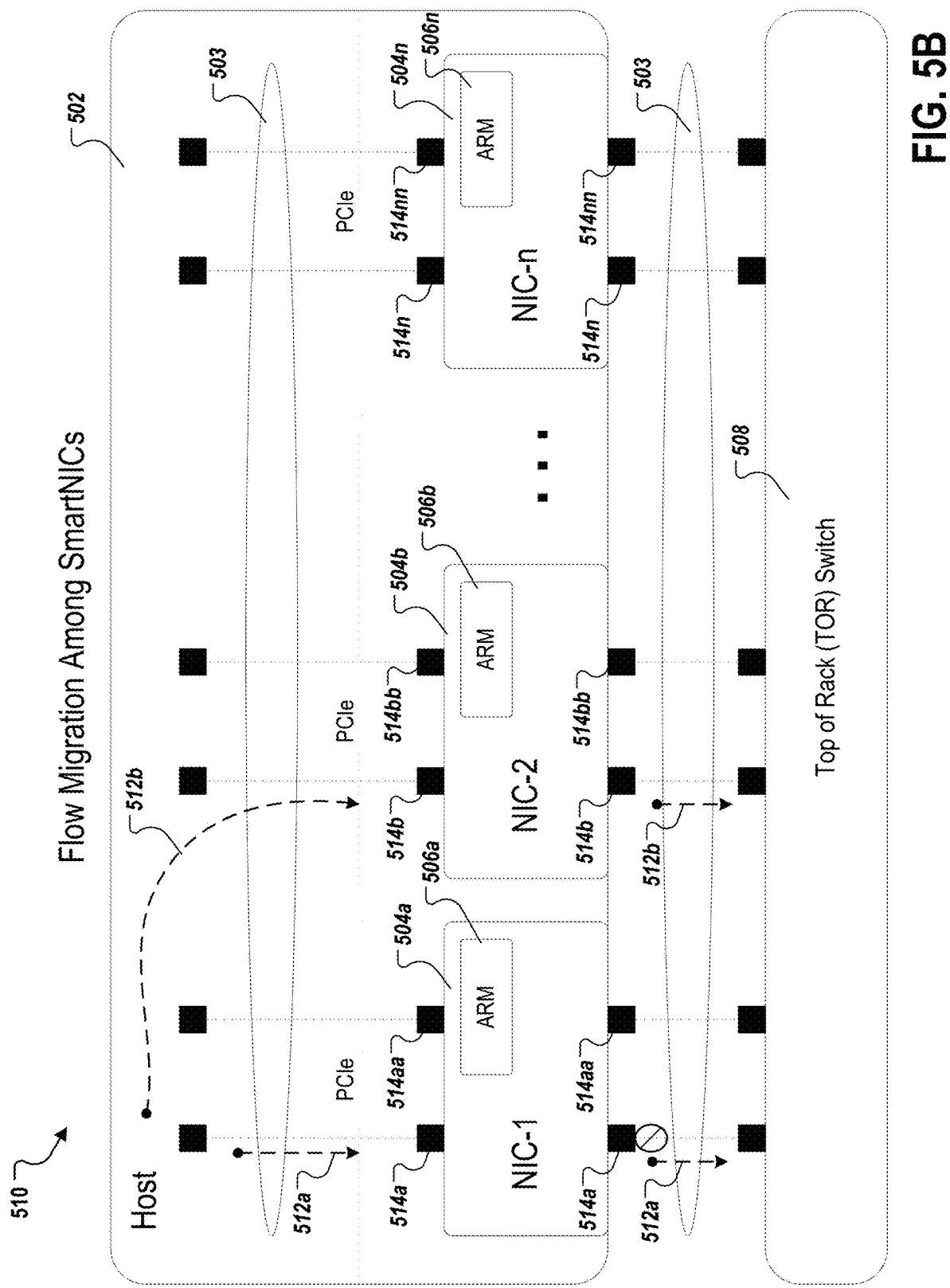
Figure 5C:
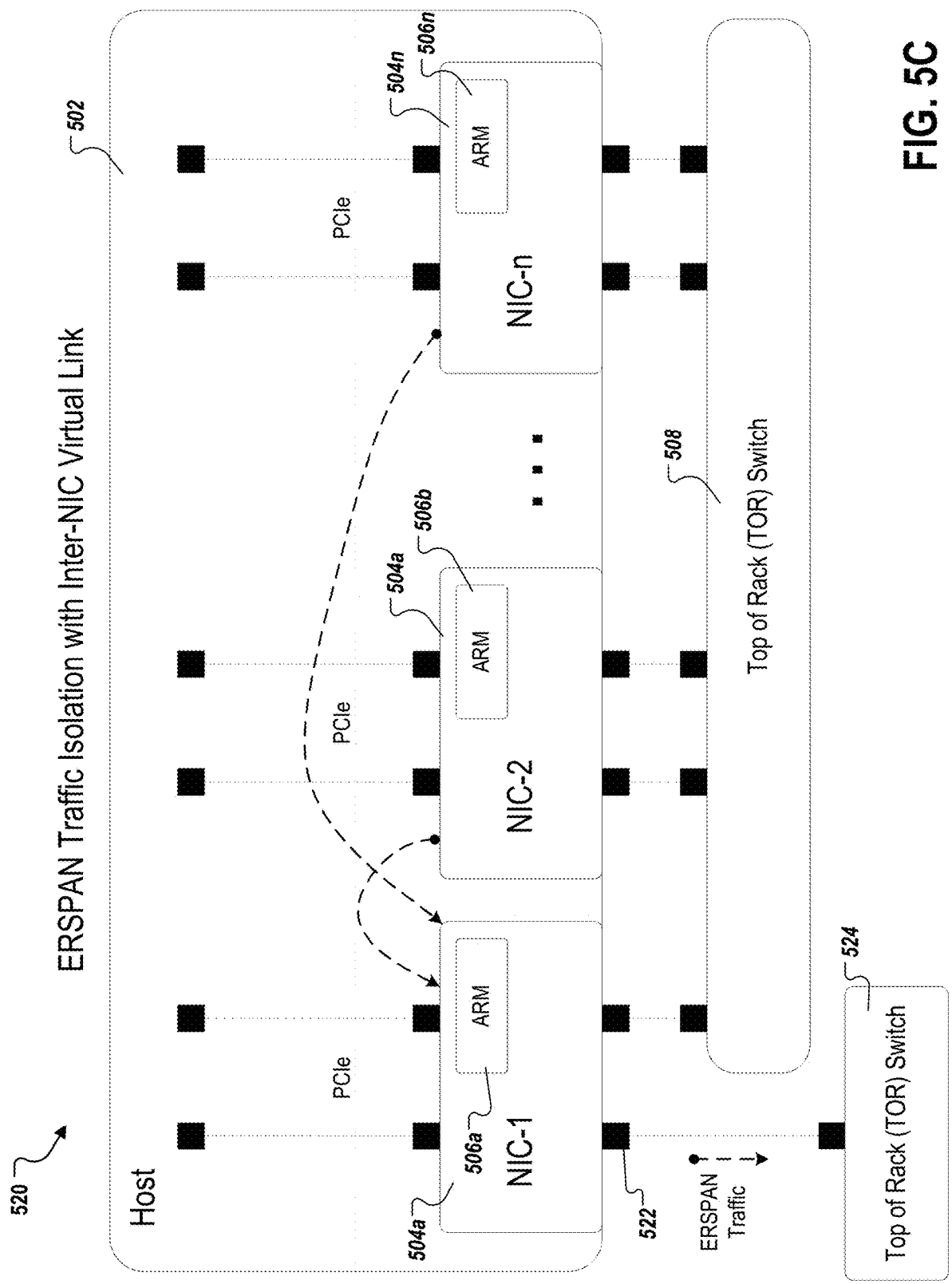

As described above, multi-smartNIC servers provide support for various features that may require communication between the SmartNICs. FIGS. 5A-5C described three such scenarios via various topologies. FIG. 5A depicts a topology where the multiple smartNICs are installed with LAG and without the described virtual link among them, a switch has no direct way to direct traffic to the proper smartNIC. FIG. 5B depicts a topology where the smartNICs can use the virtual link for migration of traffic among the linked devices. FIG. 5C depicts a topology where ERSPAN traffic can be isolation/assigned to a specific smartNIC(s) using the virtual link. The three example topologies depicted in FIGS. 5A-5C are described to provided example use cases where the described virtual link can be employed. It is contemplated, however, that implementations of the present disclosure can be realized with any number of topologies employing multi-smartNIC servers.

Inband Communication LAG Across SmartNICs

FIG. 5A depicts an example topology 500 where a virtual link among smartNICs may be employed. The example topology includes a host 502 with multiple smartNICs 504 installed with LAG 503. Each of the smartNICs 504 include at least one ARM core 506, such as described above in FIGS. 1 and 2.

As depicted, the configuration on a TOR switch 508 is a LAG 503 spanning all SmartNICs 504. With the LAG 503 across the SmartNICs 504, the TOR 508 will have no way to direct traffic to a specific ARM 506*a-n*. In such embodiments, the TOR 508 will load balance the traffic across LAG members, which may send traffic to the wrong SmartNIC. Without virtual-link, this traffic may never reach the correct ARM 506*a-n* for processing and the connectivity to the ARM 506 may not be established.

However, by establishing a virtual-link via the described system, the smartNICs 504 can communicate with each other as each smartNIC 504*a-n* can learn, for example, the MAC address behind the other smartNICs 504*a-n*. As such, by employing a virtual-link, SmartNICs 504 can perform, for example, MAC address (and associated forwarding entry) synchronization such that any of the smartNICs 504 can forward traffic to the targeted smartNIC 504*a-n* (and respective ARM 508) to which the traffic is destined. Once the virtual link has been established for each smartNIC 504, irrespective of the SmartNIC to which the TOR 508 sends traffic, the traffic can be forwarded to the right SmartNIC 504.

Flow State Synchronization for Security Policy

FIG. 5B depicts an example topology 510 where a virtual link among smartNICs may be employed. The example topology 510 is substantially similar to the example topology 500 depicted in FIG. 5A. However, this example topology 510 shows how traffic can be migrated and flow states synchronized, through a virtual link established among the smartNICs 504. The virtual link thus enables flows to take any of the smartNICs 504 and, for example, allows each of the smartNIC 504 to apply a security policy on the traffic.

As depicted with the LAG 503 across smartNICs 504, traffic for a particular flow 512 can keep moving among the smartNICs 504. This may cause flow state features, such as a security policy, to break as the flow state is not present in all the smartNICs 504. For example, when traffic for a flow, such as flow 512*a*, begins, a smartNIC 504 (e.g., smartNIC 504*a*) creates a flow state for the first packet. This particular smartNIC 504*a* can employ the flow state for subsequent packets when they are received (e.g., to determine where to forward the packets).

In a stable state, the traffic for the particular flow 512*a* may take the first link 514*a* and hence a flow state will be created in smartNIC 504*a*. However, when the first link 514*a* between the smartNIC 504*a* and TOR 508 goes down, such as depicted in FIG. 5B, the flow 512*a* moves to one of the other links (e.g., 514*aa*, 514*b*, 514*bb*, 514*n*, or 514*nn*). When the flow 512 takes the other link 514*aa* in same smartNIC 504*a*, traffic for the flow 512 can continue as the smartNIC 504*a* has access to the established flow state. However, when the flow 512 moves takes any of the other links (514*b*, 514*bb*, 514, 414*n*, 514*nn*) in the other smartNICs 504*b* or 504*n*, traffic may have to go through flow installation as those smartNICs 504*b* or 504*n* would be seeing the traffic for the flow 512 for the first time. The flow 512*b* depicted in FIG. 5B shows one such example where the flow 512 moves to the first link 514*b* for the smartNIC 504.

Moreover, for certain types of traffic, the flow state may not be created when the flow moves. For example, for TCP traffic, the smartNICs 504 expects the first packet to comprise a TCP SYN. But, the first packet received from a moved flow may not comprise the TCP SYN because, for example, the packet is from the middle of the flow. Thus, the smartNIC 504 that receives such a packet may not create the flow state and hence may drop the packet. However, if the flow state can be synchronized among the smartNICs 504 via the established virtual link, a flow, such as flow 512, can be installed on all the smartNICs 504. Therefore, even when traffic for a particular flow changes to a different smartNIC 504, the new smartNIC 504 will have the information necessary to handle the received packets.

ERSPAN Traffic Redirection for Efficient Use of Links

FIG. 5C depicts an example topology 520 where a virtual link among smartNICs may be employed. The example topology 520 is substantially similar to the example topologies 500 and 510 depicted in FIGS. 5A and 5B respectively. The example topology 520 is employed for ERSPAN isolation via a virtual link. Generally, ERSPAN destinations exist in an inband network. Traffic to these ERSPAN destinations can interfere with the workload traffic. To isolate ERSPAN traffic, a specific port(s) 522 may be dedicated for only ERSPAN. the ERSPAN traffic is then redirected from the other smartNICs to dedicated port(s) 522. With this solution, deployments can physically isolate ERSPAN traffic to a specific network (e.g., via the TOR 524).

N number of smartNICs 504 are depicted in FIGS. 5A-5C as it is contemplated that implementations of the present disclosure can be realized with any number of programmable IO devices (e.g., smartNICs). Moreover, implementations of the present disclosure can employ any number of devices as required.

Virtual Link Architectures

Figure 6A:
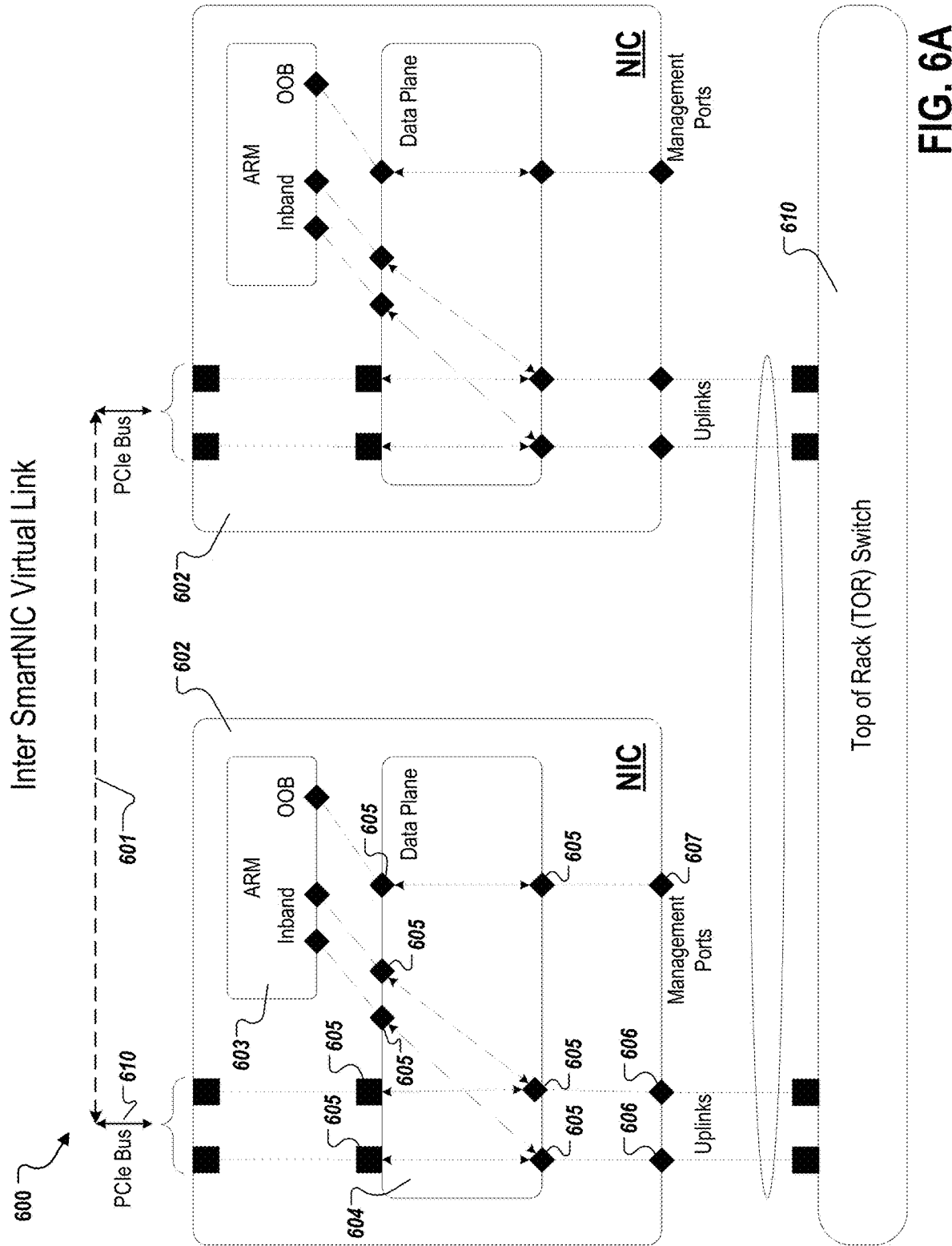
FIGS. 6A-6C depict exemplary architectures to establish a virtual link among smartNICs.
Figure 6B:
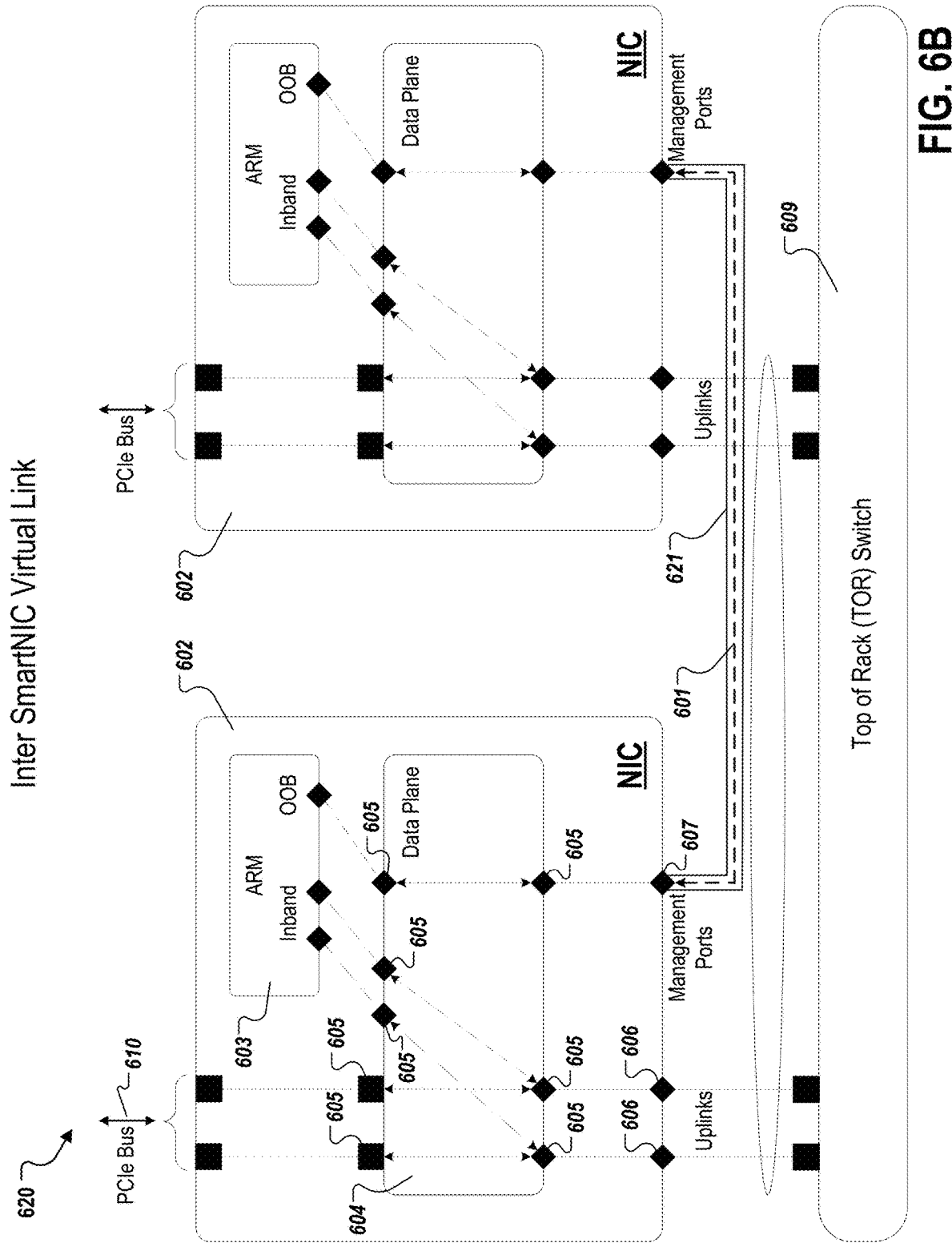
Figure 6C:
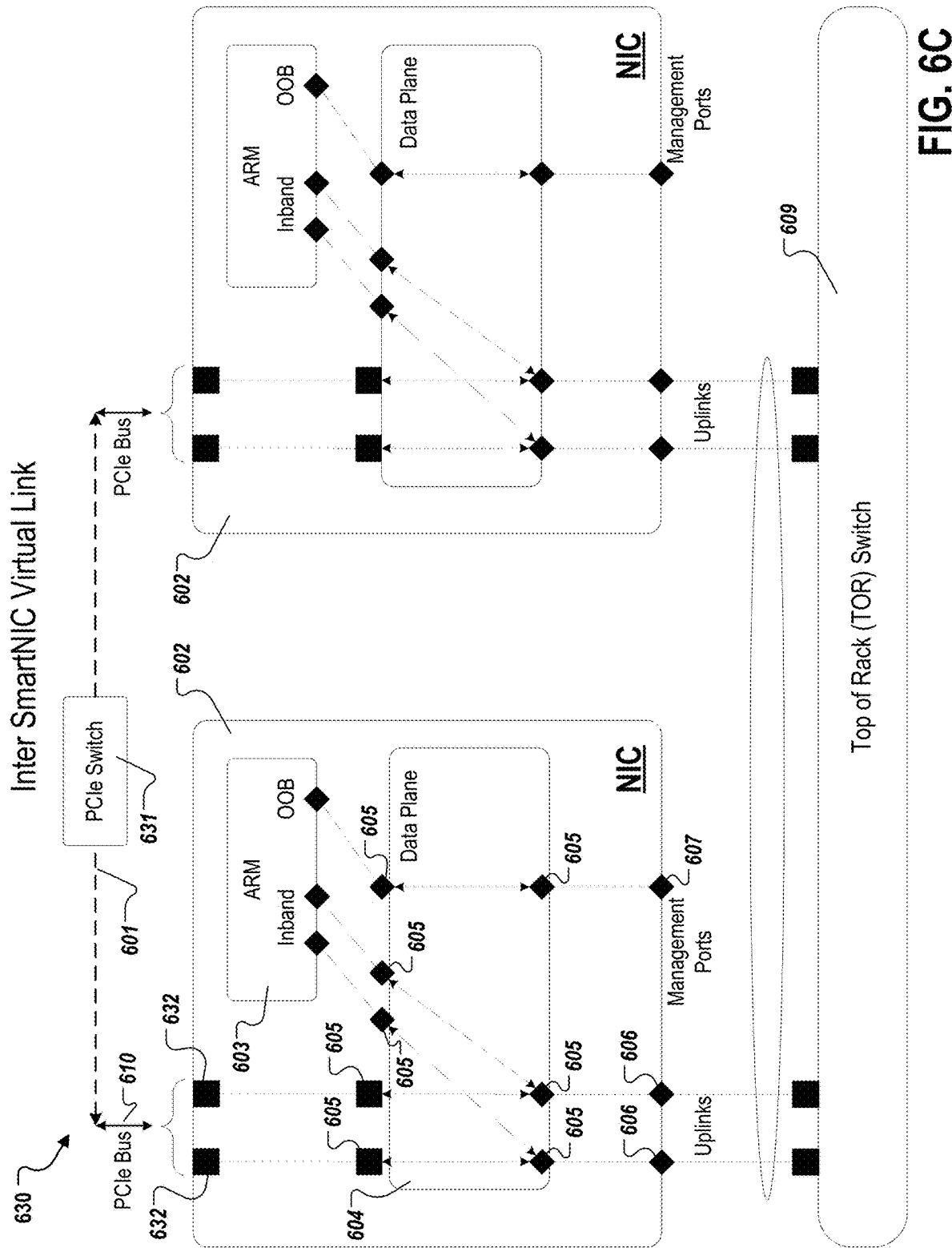

FIGS. 6A-6C depicts example architectures 600, 620, and 630 respectively that can be employed to establish a virtual link among smartNICs. Each of these example architectures include, by way of non-limiting example, two smartNICs 602. The smartNICs 602 each include a set of processors ARM cores 603, two types of physical ports (uplink ports 606 and management port 607) along with a forwarding ASIC, which is depicted as the data plane 604. In some embodiments, the smartNICs 602 are installed on a multi-smartNIC host (not shown). As depicted, the smartNICs 602 are connected via the uplink ports 606 to a TOR 608.

As described above in FIGS. 1-4, the forwarding ASIC includes various forwarding elements (not shown), such as a packet buffer, P4 stages, MPUs, SRAM, TCAM HBM, and so forth. As depicted, the data plane 604 includes logical ports 605 where packets can be received or sent as required. These logical ports 605 can be VFs and PFs toward a host, PFs toward ARM complex 603, and physical MACs toward uplink ports 606 or management ports 607. In some embodiments, all of these ports are for management of the ARM 603 as the workload traffic is received or sent through PCIe from or to the host.

As depicted in FIGS. 6A-6C, the ARM 603 can be reached through either the uplink ports 606 or the management ports 607. Inband management includes communication with the ARM 603 via the uplink ports 606 while Out of Band (OOB) management includes communication with the ARM 603 via the management port 607. In some embodiments, inband management includes both workload traffic and ARM management traffic sharing the uplink ports 606. In some embodiments, OOB management includes completely isolating the ARM management traffic from workload traffic.

FIG. 6A depicts the example architecture 600 where the virtual link 601 is established through PCIe peer-to-peer communication and provides a datapath/communication channel between the smartNICs 602. As depicted, the example architecture 600 uses a shared PCIe bus 610 to establish the virtual link 601 and avoids the use of an external cable (see FIG. 6B). In some embodiments, each smartNIC 602 exposes a memory bar in the host (see the above description of FIG. 2) accessible on the PCIe bus 610 for communication. In some embodiments, a host agent or driver is installed on the host to configure each smartNIC 602 with the PCIe bus address of the memory bars of its peer(s) smartNICs. In some embodiments once configured, the smartNIC 602 communicates directly with a peer(s) smartNIC by directing messages over the PCIe bus.

FIG. 6B depicts the example architecture 620 where the virtual link 601 is established through an out of band (OOB), external cable 621. In some embodiments, the external cable 621 connects the smartNICs 602 via the management ports 607. In some embodiments, each smartNIC 602 is configured to send any received traffic with a destination to the other smartNIC to the MAC address for the management port 607 of the other smartNIC via the established virtual link 601. Thus, a datapath is set up between the smartNICs 602 through the external cable 621. As such, any packets destined for a particular one of the smartNICs 602 can be forwarded, via the external cable, from the other smartNIC and vice versa.

Some systems may not support peer-to-peer communication on the PCIe bus 610 as depicted in FIG. 6A. Also, some systems connect different PCIe interfaces 632 to different CPU sockets so PCIe peer-to-peer traffic would have to transit CPU-to-CPU interconnects thus consuming valuable CPU bandwidth. Both of these drawbacks can be avoided by the example architecture 630 depicted in FIG. 6C, which connects PCIe interfaces 632 to establish the virtual link 601 through a PCIe switch 631 that is on call and supports PCIe peer-to-peer traffic.

In some embodiments, the PCIe switch 631 is a device that switches PCIe buses 610 on, for example, the motherboard of the host. In some embodiments, packets are routed through the PCIe switch 631 based on, for example, a memory address, an IO address, a device identifier or through implicit transactions. In some embodiments, data transfer switching takes place by using the information in transaction layer packet (TLP) headers. In some embodiments, data is transferred between end points and is routed such that data communication in one direction follows the same direction through the PCIe Switch 631 in the back path with information stored in a completer TLP.

The example architecture 630 guarantees that PCIe traffic can pass between the connected smartNICs 602 in the connected PCIe interfaces 632 and alleviate pressure on the CPU-to-CPU interconnect. Another benefit to this architecture is that no external cable is required, and the communication and setup is done internally.

Example Processes

Figure 7:
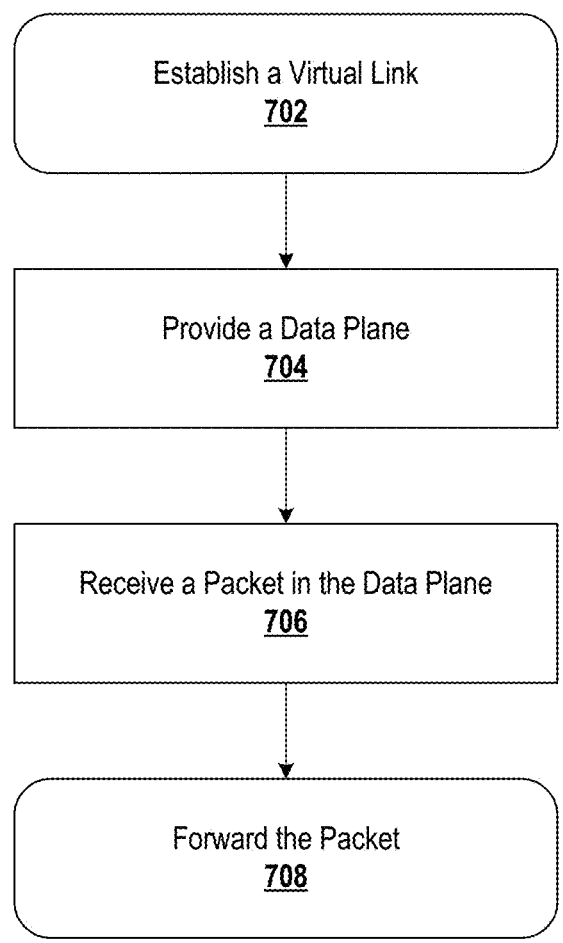
FIG. 7 depicts a flowchart of non-limiting exemplary processes that can be implemented by embodiments of the present disclosure.

FIG. 7 depicts a flowchart of an example process 700. The example process 700 can be implemented by the various elements of the described system. As depicted, the example processes show in more detail how a virtual link is established among two programmable IO device installed on a host. Process 700 is implemented by employing an architecture, such as depicted in FIGS. 6A-6C. Generally, the process 700 establishes a virtual link between another programmable IO device installed on the host device and provides a data plane using the virtual link.

For clarity of presentation, the description that follows generally describes the example process 700 in the context of FIGS. 1-6C, 7, and 8. However, it will be understood that the process 700 may be performed, for example, by any other suitable system, environment, software, and hardware, or a combination of systems, environments, software, and hardware as appropriate. In some embodiments, various operations of the process 700 can be run in parallel, in combination, in loops, or in any order. In some embodiments, the programmable IO device comprises a smartNIC. In some embodiments, the programmable IO devices are installed with LAG across the programmable IO devices.

At 702 the virtual link is established with the other programmable IO device installed on the host device. In some embodiments, the virtual link provides a communication channel between the programmable IO devices. In some embodiments, the programmable IO device is installed on the host device via a PCIe interface. In some embodiments, the virtual link is established through PCIe peer-to-peer communication. In some embodiments, the virtual link is established via a shared PCIe bus. In some embodiments, a memory bar accessible on the PCIe bus for communication to establish the virtual link is exposed. In some embodiments, an agent or a driver is installed on the host device, and wherein the agent or drive configures the programmable IO device with a PCIe bus address of memory bars exposed by the other programmable IO device. In some embodiments, once configured by the agent or the driver, the other programmable IO device is communicated with directly through directing messages over the PCIe bus to establish the virtual link. In some embodiments, the programmable IO device comprises a management port. In some embodiments, the virtual link is established via an external cable connected to the management port. In some embodiments, the virtual link is established through a PCIe switch configured to connect PCIe interfaces and PCIe peer-to-peer traffic. From 702, the process 700 proceeds to 704.

At 704, the data plane is provided by establishing, with the other programmable IO device via the virtual link, a data path associated with the data plane. In some embodiments, a MAC address for the other programmable IO device is determined via the virtual link. In some embodiments, MAC address synchronization is performed with the other programmable IO device via the virtual link. In some embodiments, synchronizing a flow state for the data plane with the other programmable IO device is synchronized via the virtual link. In some embodiments, a security policy is applied in the data plane based on the synchronized flow state. From 704, the process 700 proceeds to 706.

At 706, a packet in the data plane destined for the other programmable IO device is received. In some embodiments, the programmable IO device comprises at least one ARM core communicably coupled to at least one CPU core of the host device. In some embodiments, the packet is proceeded with the ARM core to determine the destination of the packet. In some embodiments, the packet is received from a TOR switch. From 706, the process 700 proceeds to 708.

At 708 the packet is forwarded to the other programmable IO device via the virtual link. In some embodiments, the other programmable IO device comprises at last one port dedicated to ERSPAN traffic. In some embodiments, received ERSPAN traffic is forwarded to the other programmable IO device. From 708, the process 700 ends.

Computer Systems

Figure 8:
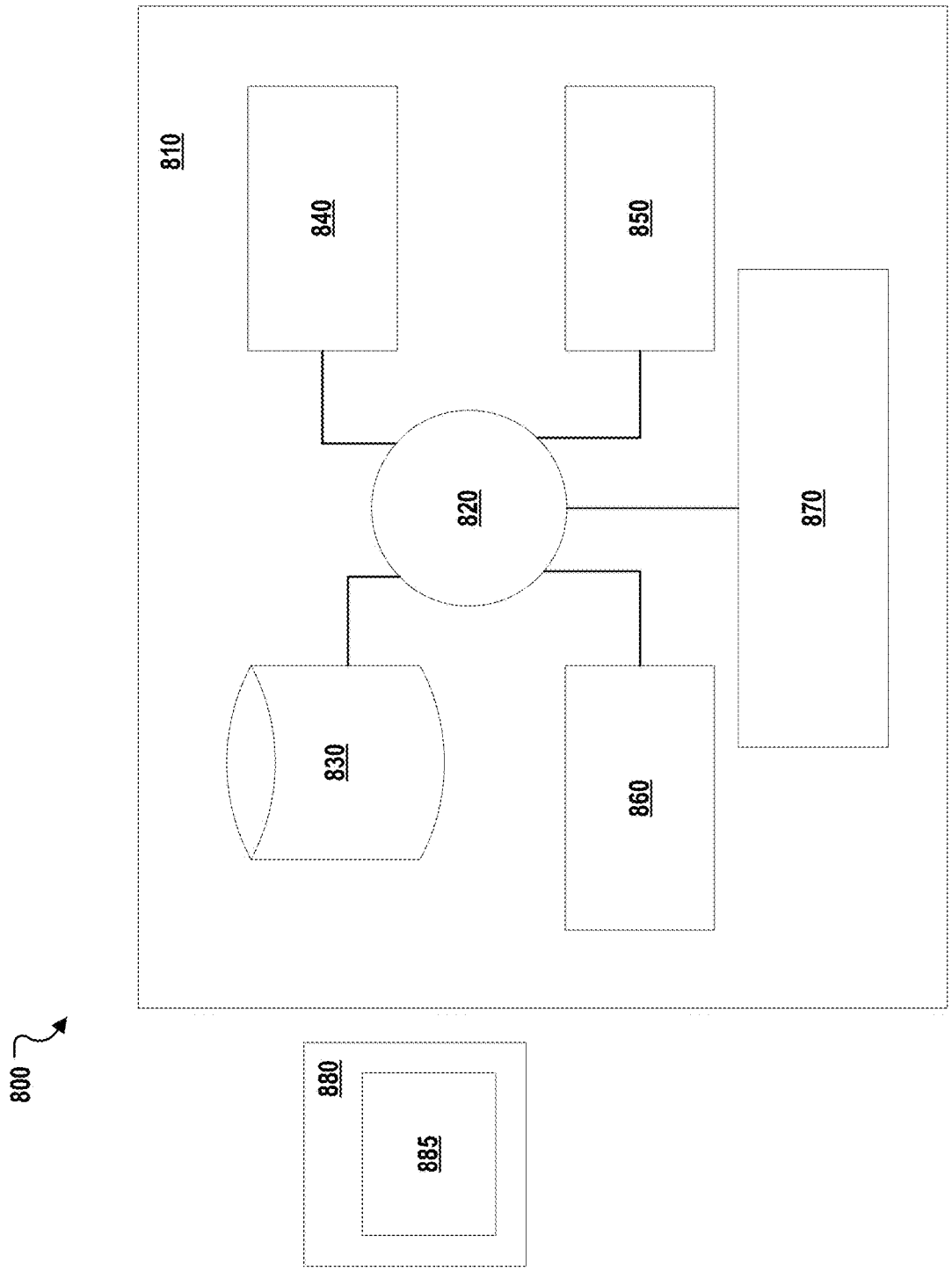
FIG. 8 depicts a non-limiting exemplary computer system that can be programmed or otherwise configured to implement methods or systems of the present disclosure.

Computer systems are provided herein that can be used to implement methods or systems of the disclosure. FIG. 8 depicts an example a computer system 800 that can be programmed or otherwise configured to implement methods or systems of the present disclosure. For example, the computing device 810 can be programmed or otherwise configured to employ the IO subsystem 870 to provide a wire-speed TCP/IP proxy service that is transparent to host applications. As depicted, the computer system 800 includes a computing device 810 and an optional electronic display 880. In some embodiments, the computing device 810 is substantially similar to the computing system 120 depicted in FIG. 1. In some embodiments, the computing device 810 is substantially similar to the host 502 depicted in FIGS. 5A-5C.

In the depicted embodiment, the computing device 810 includes a CPU (also "processor" and "computer processor" herein) 820, which is optionally a single core, a multi core processor, or a plurality of processors for parallel processing. The computing device 810 also includes memory or memory location 830 (e.g., random-access memory, read-only memory, flash memory); electronic storage unit 840 (e.g., hard disk); communication interface 850 (e.g., network adapter) for communicating with one or more other systems; peripheral devices 860 (e.g., cache, other memory, data storage or electronic display adapters), and 10 subsystem 870 (e.g., an IO device, such as a smartNIC or ISA). The memory 830, the electronic storage unit 840, the communication interface 850, the peripheral devices 860, and the IO subsystem 870 are in communication with the CPU 820 through a communication bus (solid lines), such as a motherboard.

In some embodiments, the CPU 820 can execute a sequence of machine-readable instructions, which can be embodied in a program or software. The instructions may be stored in a memory location, such as the memory 830. The instructions can be directed to the CPU 820, which can subsequently program or otherwise configure the CPU 820 to implement methods of the present disclosure. Examples of operations performed by the CPU 820 can include fetch, decode, execute, and write back. In some embodiments, the CPU 820 is part of a circuit, such as an integrated circuit. One or more other components of the computing device 810 can be optionally included in the circuit. In some embodiments, the circuit is an ASIC or a Field Programmable Gate Array (FPGA).

In some embodiments, the IO subsystem 870 (e.g., the above described programmable IO device) comprises an expansion card, such as a smartNIC, that is connected with the CPU 820 via PCIe. In some embodiments, the IO subsystem 870 is a completely programmable ASIC engine. In some embodiments, an ASIC engine is tailored to a specific subset of functions, such as compression and checksum, while another engine is dedicated for symmetric cryptography.

In some embodiments, the electronic storage unit 840 includes a data storage unit (or data repository) for storing data. In some embodiments, the electronic storage unit 840 stores files, such as drivers, libraries, images, and saved programs. In some embodiments, the electronic storage unit 840 stores user data, e.g., user preferences and user programs. In some embodiments, the computing device 810 includes one or more additional data storage units that are external, such as located on a remote server that is in communication through an intranet or the internet.

Figure 9:
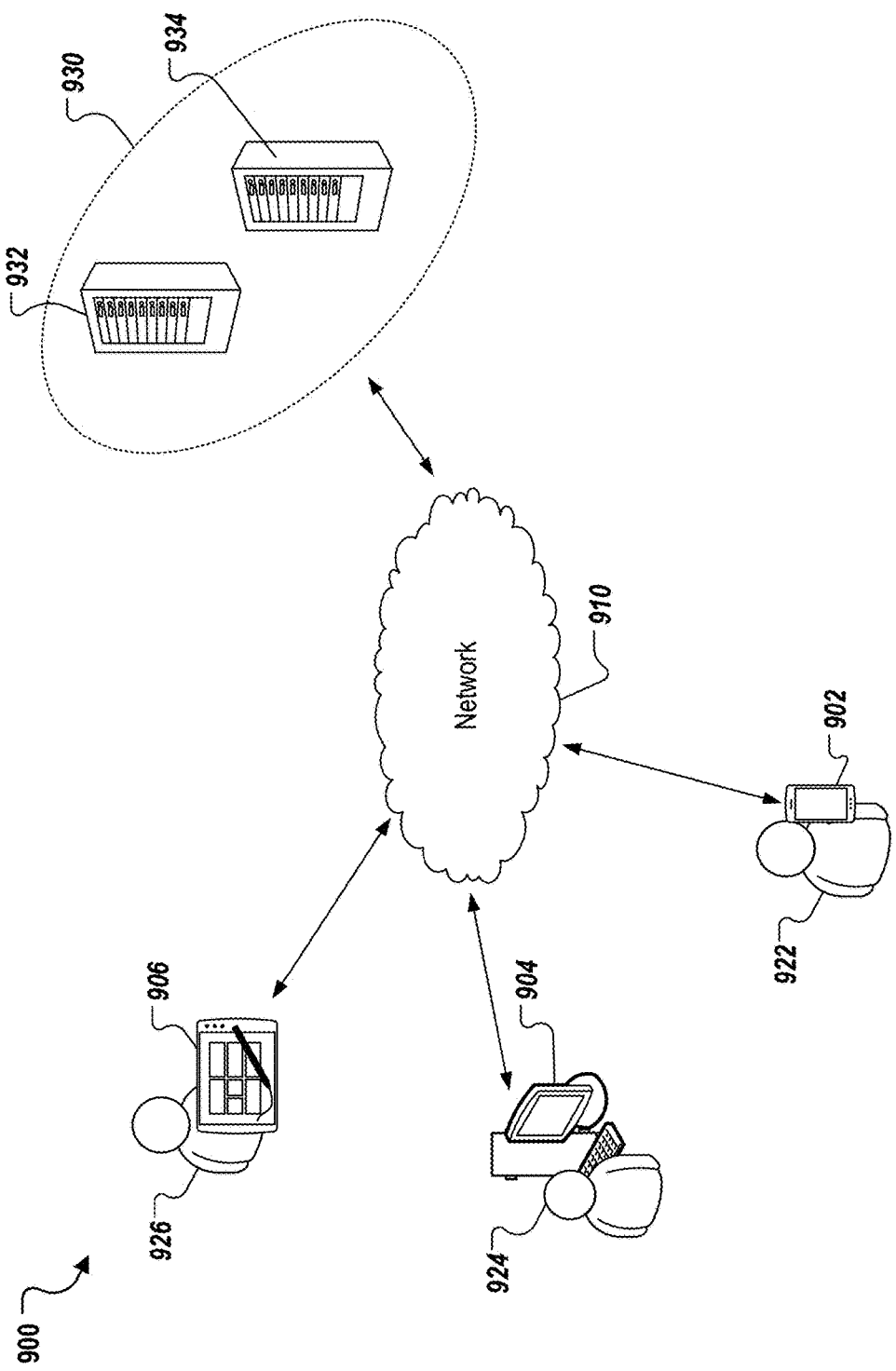
FIG. 9 depicts a non-limiting exemplary environment where implementations of the present disclosure can be employed.

The computing device 810 is optionally operatively coupled to a network, such as the network 910 depicted and described in FIG. 9, with the aid of the communication interface 850. In some embodiments, the computing device 810 communicates with one or more remote computer systems through the network. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. In some embodiments, a user can access the computing device 810 via a network.

In some embodiments, methods as described herein are implemented by way of machine (e.g., computer processor) executable code stored on an electronic storage location of the computing device 810, such as, for example, on the memory 830 or the electronic storage unit 840. In some embodiments, the CPU 820 is adapted to execute the code. In some embodiments, the machine executable or machine-readable code is provided in the form of software. In some embodiments, during use, the code is executed by the CPU 820. In some embodiments, the code is retrieved from the electronic storage unit 840 and stored on the memory 830 for ready access by the CPU 820. In some situations, the electronic storage unit 840 is precluded, and machine-executable instructions are stored on the memory 840. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 810 can include or be in communication with the electronic display 880. In some embodiments, the electronic display 880 provides a user interface (UI) 885.

Example Environment

FIG. 9 depicts an example environment 900 that can be employed to execute implementations of the present disclosure. The example system 900 includes computing devices 902, 904, and 906; a back-end system 930; and a network 910.

In some embodiments, the network 910 includes a local area network (LAN), wide area network (WAN), the Internet, or a combination thereof, and connects web sites, devices (e.g., the computing devices 902, 904, and 906) and back-end systems (e.g., the back-end system 930). In some embodiments, the network 910 includes the Internet, an internet, and/or extranet, or an intranet and/or extranet that is in communication with the Internet. In some embodiments, the network 910 includes a telecommunication and/or data network. In some embodiments, the network 910 can be accessed over a wired and/or a wireless communications link. For example, mobile computing devices (e.g., the smartphone device 902 and the tablet device 906), can use a cellular network to access the network 910.

In the depicted example environment 900, the back-end system 930 includes server devices 932 and 934, which can be employed to implement the described system via programmable IO devices, such as smart NICs, installed on the devices. In some embodiments, the back-end system 930 may be deploy within a data center that provides services, such as a web service, the computing devices 902, 904, and 906. The described system may be employed within the example environment 900 through an IO subsystem to establish a virtual link between another IO subsystem installed on the respective server devices 932 and 934 and provide a data plane using the virtual link.

In some embodiments, back-end system 930 includes computer systems using clustered computers and components to act as a single pool of seamless resources when accessed through the network 910. For example, such implementations may be used in data center, cloud computing, storage area network (SAN), and network attached storage (NAS) applications. In some embodiments, the servers 932 and 934 hosts one or more computer-implemented services with which users 922, 924, and 926 can interact using the respective computing devices 902, 904, and 906.

In some embodiments, the server devices 932 and 934 are each sustainably similar to the computing device 810 depicted in FIG. 8 as well as the host 302 depicted in FIGS. 5A-5C. In some embodiments, the server devices 932 and 934 are server-class hardware type devices.

Processing Devices and Processors

In some embodiments, the platforms, systems, media, and methods described herein include a computer, or use of the same. In further embodiments, the computer includes one or more hardware CPUs or general-purpose graphics processing units (GPGPUs) that carry out the device's functions by providing chains of operation to an IO subsystem provided through a SmartNIC connected to the CPU or GPGPU via PCIe. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc (CD)-Read only Memories (ROMs), Digital Versatile Disks (DVDs), flash memory devices, magnetic disk drives, magnetic tapes drives, optical disk drives, and cloud computing-based storage. In further embodiments, the storage and/or memory device is a combination of devices such as those disclosed herein.

Non-transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. In some embodiments, a computer program includes a sequence of instructions, executable in the computer's CPU or in the processors of an IO subsystem, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

While portions of this disclosure, for demonstrative purposes, refer to wired and/or wired communication systems or methods, embodiments of the described system are not limited in this regard. As an example, one or more wired communication systems, can utilize one or more wireless communication components, one or more wireless communication methods or protocols, or the like.

While preferred embodiments of the present subject matter have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments of the subject matter described herein may be employed in practicing the described system.

What is claimed is:

1. A multi-smart network interface card (smartNIC) server system that provides a data plane, the system comprising:
at least two smartNICs installed via a peripheral component interconnect express (PCIe) interface, each smartNIC configured to:
establish a virtual link with the other smartNICs, wherein the virtual link provides a communication channel among the smartNICs;

provide the data plane by establishing, with the other smartNICs via the virtual link, a data path associated with the data plane;

receive a packet in the data plane destined for one of the other smartNICs; and forward the packet to the one of the other smartNICs via the virtual link.

2. The multi-smartNIC server system of claim 1, wherein the virtual link is established through PCIe peer-to-peer communication.

3. The multi-smartNIC server system of claim 1, wherein the virtual link is established via a shared PCIe bus.

4. The multi-smartNIC server system of claim 3, wherein the smartNICs are configured to expose a memory base address register (BAR) accessible on the PCIe interface for communication to establish the virtual link, wherein the multi-smartNIC server system comprises an agent or a driver that configures each of the smartNICs with a PCIe bus address of the memory BARs exposed by the other smartNICs, and wherein the smartNICs communicating directly through directing messages over the PCIe bus to establish the virtual link once configured by the agent or the driver.

5. The multi-smartNIC server system of claim 1, wherein each of the smartNICs comprises a management port, and wherein the virtual link is established via an external cable connected to each of the management ports.

6. The multi-smartNIC server system of claim 1, wherein the virtual link is established through a PCIe switch configured to connect PCIe interfaces and PCIe peer-to-peer traffic.

7. The multi-smartNIC server system of claim 1, comprising:

at least one central processing unit (CPU) core; and at least one advanced reduced instruction set computer (RISC) machine (ARM) core communicably coupled to the at least one CPU core, wherein the packet is processed with the ARM core to determine a destination of the packet.

8. The multi-smartNIC server system of claim 1, wherein each of the smartNICs are installed with link aggregation groups (LAG) across the smartNICs.

9. The multi-smartNIC server system of claim 1, wherein each of the smartNICs are configured to:

determine a media access control (MAC) address for the other smartNICs via the virtual link; and perform MAC address synchronization with the other smartNICs via the virtual link.

10. The multi-smartNIC server system of claim 1, wherein each of the smartNICs are configured to:

synchronize a flow state for the data plane with the other smartNICs via the virtual link; and apply a security policy in the data plane based on the synchronized flow state.

11. The multi-smartNIC server system of claim 1, wherein at least one of the smartNICs comprises at last one port dedicated to encapsulated remote switched port analyzer (ERSPAN) traffic, and wherein each of the smartNICs are configured to forward received ERSPAN traffic to the at least one of the smartNICs.

12. The multi-smartNIC server system of claim 1, wherein the packet is received from a top of rack (TOR) switch.

13. A method for providing a data plane through a virtual link established between smart network interface cards (smartNICs) each installed on a multi-smartNIC server via a peripheral component interconnect express (PCIe) interface, the method being executed by at least one of the smartNICs and comprising:

exposing at least one memory base address register (BAR) for communication, the memory BAR accessible on a PCIe bus shared between the smartNICs;

receiving, from an agent installed on the multi-smartNIC server, a PCIe bus address of at least one memory BAR exposed by the other smartNIC;

establishing the virtual link with the other smartNIC through PCIe peer-to-peer direct communication via the PCIe bus;

providing the data plane by establishing, with the other smartNIC via the virtual link, a data path associated with the data plane;

receiving a packet in the data plane destined for the other smartNIC; and forwarding the packet to the other smartNIC via the virtual link.

14. The method of claim 13, wherein the multi-smartNIC server comprises:

at least one central processing unit (CPU) core; and at least one advanced reduced instruction set computer (RISC) machine (ARM) core communicably coupled to the at least one CPU core, wherein the packet is processed with the ARM core to determine a destination of the packet.

15. The method of claim 13, wherein each of the smartNICs are installed with link aggregation groups (LAG) across the smartNICs.

16. The method of claim 13, comprising:

determining a media access control (MAC) address for the other smartNIC via the virtual link; and performing MAC address synchronization with the other smartNIC via the virtual link.

17. The method of claim 13, comprising:

synchronizing a flow state for the data plane with the other smartNIC via the virtual link; and applying a security policy in the data plane based on the synchronized flow state.

18. The method of claim 13, wherein at least one of the smartNICs comprises at last one port dedicated to encapsulated remote switched port analyzer (ERSPAN) traffic, and wherein the method comprises forwarding received ERSPAN traffic to the at least one of the smartNICs.

19. The method of claim 13, wherein the packet is received from a top of rack (TOR) switch.

20. A method for providing a data plane through a virtual link established between smart network interface cards (smartNICs) each installed on a multi-smartNIC server via a peripheral component interconnect express (PCIe) interface, the method being executed by at least one of the smartNICs and comprising:

establish the virtual link with the other smartNIC via an external cable connected to a management port of each of the smartNICs;

providing the data plane by establishing, with the other smartNIC via the virtual link, a data path associated with the data plane;

receiving a packet in the data plane destined for the other smartNIC; and forwarding the packet to the other smartNIC via the virtual link.

21. The method of claim 20, wherein the multi-smartNIC server comprises:

at least one central processing unit (CPU) core; and at least one advanced reduced instruction set computer (RISC) machine (ARM) core communicably coupled to the at least one CPU core, wherein the packet is processed with the ARM core to determine a destination of the packet.

22. The method of claim 20, wherein each of the smartNICs are installed with link aggregation groups (LAG) across the smartNICs.

23. The method of claim 20, comprising:
determining a media access control (MAC) address for the other smartNIC via the virtual link; and
performing MAC address synchronization with the other smartNIC via the virtual link.

24. The method of claim 20, comprising:
synchronizing a flow state for the data plane with the other smartNIC via the virtual link; and
applying a security policy in the data plane based on the synchronized flow state.

25. The method of claim 20, wherein at least one of the smartNICs comprises at last one port dedicated to encapsulated remote switched port analyzer (ERSPAN) traffic, and wherein the method comprises forwarding received ERSPAN traffic to the at least one of the smartNICs.

26. The method of claim 20, wherein the packet is received from a top of rack (TOR) switch.

27. A method for providing a data plane through a virtual link established between smart network interface cards (smartNICs) each installed on a multi-smartNIC server via a peripheral component interconnect express (PCIe) interface, the method being executed by at least one of the smartNICs and comprising:
establish the virtual link with the other smartNIC through a PCIe switch configured to connect PCIe interfaces and PCIe peer-to-peer traffic;
providing the data plane by establishing, with the other smartNIC via the virtual link, a data path associated with the data plane;
receiving a packet in the data plane destined for the other smartNIC; and
forwarding the packet to the other smartNIC via the virtual link.

28. The method of claim 27, wherein the multi-smartNIC server comprises:
at least one central processing unit (CPU) core; and
at least one advanced reduced instruction set computer (RISC) machine (ARM) core communicably coupled to the at least one CPU core, wherein the packet is processed with the ARM core to determine a destination of the packet.

29. The method of claim 27, wherein each of the smartNICs are installed with link aggregation groups (LAG) across the smartNICs.

30. The method of claim 27, comprising:
determining a media access control (MAC) address for the other smartNIC via the virtual link; and
performing MAC address synchronization with the other smartNIC via the virtual link.

31. The method of claim 27, comprising:
synchronizing a flow state for the data plane with the other smartNIC via the virtual link; and
applying a security policy in the data plane based on the synchronized flow state.

32. The method of claim 27, wherein at least one of the smartNICs comprises at last one port dedicated to encapsulated remote switched port analyzer (ERSPAN) traffic, and wherein the method comprises forwarding received ERSPAN traffic to the at least one of the smartNICs.

33. The method of claim 27, wherein the packet is received from a top of rack (TOR) switch.

* * * * *

UNITED STATES PATENT AND TRADEMARK OFFICE
CERTIFICATE OF CORRECTION

PATENT NO. : 10,997,106 B1
APPLICATION NO. : 17/028242
DATED : May 4, 2021
INVENTOR(S) : Bharat Bandaru, Pirabhu Raman and J. Bradley Smith It is certified that error appears in the above-identified patent and that said Letters Patent is hereby corrected as shown below:

In the Claims

In Claim 20, Column 32, Line 55, please delete the word "establish" and replace it with --establishing--

In Claim 27, Column 33, Line 33, please delete the word "establish" and replace it with --establishing--

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*